(12) United States Patent
Morikuni

(10) Patent No.: US 11,754,916 B2
(45) Date of Patent: Sep. 12, 2023

(54) PROJECTION SYSTEM AND PROJECTOR THAT HAVE A SHORTER PROJECTION DISTANCE

(71) Applicant: SEIKO EPSON CORPORATION, Tokyo (JP)

(72) Inventor: Eiji Morikuni, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/156,046

(22) Filed: Jan. 22, 2021

(65) Prior Publication Data
US 2021/0232034 A1 Jul. 29, 2021

(30) Foreign Application Priority Data
Jan. 24, 2020 (JP) .................................. 2020-009800

(51) Int. Cl.
G03B 21/28 (2006.01)
G02B 17/08 (2006.01)
G03B 21/20 (2006.01)

(52) U.S. Cl.
CPC ......... *G03B 21/28* (2013.01); *G02B 17/0816* (2013.01); *G03B 21/2066* (2013.01)

(58) Field of Classification Search
CPC ........................... G03B 21/28; G02B 17/0816
See application file for complete search history.

(56) References Cited

U.S. PATENT DOCUMENTS

| | | | |
|---|---|---|---|
| 5,912,764 A | 6/1999 | Togino | |
| 5,973,858 A * | 10/1999 | Sekita | G02B 17/0848 359/364 |
| 6,104,537 A | 8/2000 | Togino | |
| 6,128,137 A | 10/2000 | Togino | |
| 6,366,400 B1 * | 4/2002 | Ohzawa | G02B 27/0172 359/364 |
| 7,048,388 B2 | 5/2006 | Takaura et al. | |
| 7,114,818 B2 * | 10/2006 | Minakata | G02B 17/04 359/859 |
| 7,385,767 B2 * | 6/2008 | Minakata | G02B 15/00 359/678 |
| 7,549,755 B2 | 6/2009 | Suzuki | |

(Continued)

FOREIGN PATENT DOCUMENTS

| | | |
|---|---|---|
| JP | H10-090603 A | 4/1998 |
| JP | H11-194267 A | 7/1999 |

(Continued)

*Primary Examiner* — Bao-Luan Q Le
(74) *Attorney, Agent, or Firm* — Oliff PLC

(57) ABSTRACT

A projection system includes a first optical system and a second optical system including an optical element and disposed on the enlargement side of the first optical system. The optical element has a first transmissive surface, a first reflection surface disposed on the enlargement side of the first transmissive surface, a second reflection surface disposed on the enlargement side of the first reflection surface, and a second transmissive surface disposed on the enlargement side of the second reflection surface. The second reflection surface has a concave shape. A first optical axis of the first optical system and a second optical axis of the second reflection surface intersect each other.

17 Claims, 34 Drawing Sheets

(56) References Cited

U.S. PATENT DOCUMENTS

| | | | |
|---|---|---|---|
| 7,675,685 B2* | 3/2010 | Tsuyuki | G02B 27/0172 359/631 |
| 2002/0008853 A1* | 1/2002 | Sunaga | G02B 17/0663 353/69 |
| 2003/0090794 A1* | 5/2003 | Chatani | G03B 21/56 359/449 |
| 2003/0133082 A1* | 7/2003 | Sunaga | G02B 17/0663 353/70 |
| 2004/0027544 A1* | 2/2004 | Chatani | H04N 5/74 353/37 |
| 2004/0032571 A1* | 2/2004 | Sunaga | G02B 17/0848 353/77 |
| 2004/0032666 A1* | 2/2004 | Baba | G02B 13/16 359/639 |
| 2004/0156117 A1 | 8/2004 | Takaura et al. | |
| 2004/0174611 A1* | 9/2004 | Hatakeyama | G02B 13/16 359/676 |
| 2004/0184009 A1* | 9/2004 | Hatakeyama | H04N 9/3141 353/70 |
| 2004/0201904 A1* | 10/2004 | Togino | G02B 17/0816 359/720 |
| 2004/0223126 A1* | 11/2004 | Hatakeyama | G02B 17/0848 353/122 |
| 2004/0264006 A1* | 12/2004 | Hatakeyama | G02B 17/0663 359/726 |
| 2005/0219671 A1* | 10/2005 | Inoguchi | G02B 27/017 359/208.1 |
| 2005/0280778 A1* | 12/2005 | Kurioka | H04N 9/3105 353/20 |
| 2006/0193036 A1 | 8/2006 | Suzuki | |
| 2010/0290133 A1 | 11/2010 | Sano et al. | |
| 2011/0002046 A1 | 1/2011 | Wada et al. | |
| 2011/0032606 A1 | 2/2011 | Imaoka | |
| 2012/0019791 A1* | 1/2012 | Abe | G03B 21/28 353/99 |
| 2016/0313631 A1* | 10/2016 | Sugawara | G03B 21/28 |
| 2019/0011684 A1 | 1/2019 | Ishihara et al. | |
| 2019/0264885 A1* | 8/2019 | Lefaudeux | F21S 41/153 |
| 2019/0285979 A1* | 9/2019 | Takano | G02B 13/16 |
| 2020/0033715 A1 | 1/2020 | Morikuni | |
| 2022/0082805 A1* | 3/2022 | Uchida | G03B 21/28 |

FOREIGN PATENT DOCUMENTS

| | | |
|---|---|---|
| JP | 2004-246042 A | 9/2004 |
| JP | 2006-235516 A | 9/2006 |
| JP | 2007-316674 A | 12/2007 |
| JP | 2010-020344 A | 1/2010 |
| JP | 2010-266577 A | 11/2010 |
| JP | 2011-013469 A | 1/2011 |
| JP | 2011-053663 A | 3/2011 |
| JP | 2017-156712 A | 9/2017 |
| JP | 2017-156713 A | 9/2017 |
| JP | 2017-156714 A | 9/2017 |
| JP | 2019-133061 A | 8/2019 |
| JP | 2020024377 A | 2/2020 |
| JP | 2020-042103 A | 3/2020 |
| JP | 2020-194115 A | 12/2020 |

\* cited by examiner

PROJECTION SYSTEM AND PROJECTOR THAT HAVE A SHORTER PROJECTION DISTANCE

The present application is based on, and claims priority from JP Application Serial Number 2020-009800, filed Jan. 24, 2020, the disclosure of which is hereby incorporated by reference herein in its entirety.

BACKGROUND

1. Technical Field

The present disclosure relates to a projection system and a projector.

2. Related Art

JP-A-2010-20344 describes a projector that enlarges and projects a projection image formed by an image formation section via a projection system. The projection system described in JP-A-2010-20344 is formed of a first optical system and a second optical system sequentially arranged from the reduction side toward the enlargement side. The first optical system is a refractive optical system including a plurality of lenses. The second optical system is formed of a reflection mirror having a concave reflection surface. The image formation section includes a light source and a light valve. The image formation section forms a projection image in the reduction-side image formation plane of the projection system. The projection system forms an intermediate image in a position between the first optical system and the reflection surface and projects a final image on a screen disposed in the enlargement-side image formation plane of the projection system.

The projection system and the projector are required to have a shorter projection distance.

SUMMARY

To achieve the object described above, a projection system according to an aspect of the present disclosure includes a first optical system and a second optical system including an optical element and disposed on an enlargement side of the first optical system. The optical element has a first transmissive surface, a first reflection surface disposed on the enlargement side of the first transmissive surface, a second reflection surface disposed on the enlargement side of the first reflection surface, and a second transmissive surface disposed on the enlargement side of the second reflection surface. The second reflection surface has a concave shape. A first optical axis of the first optical system and a second optical axis of the second reflection surface intersect each other.

A projector according to another aspect of the present disclosure includes the projection system described above and an image formation section that forms a projection image in a reduction-side image formation plane of the projection system.

DESCRIPTION OF EXEMPLARY EMBODIMENTS

A projection system according to an embodiment of the present disclosure and a projector including the projection system will be described below in detail with reference to the drawings.

Projector

Figure 1:
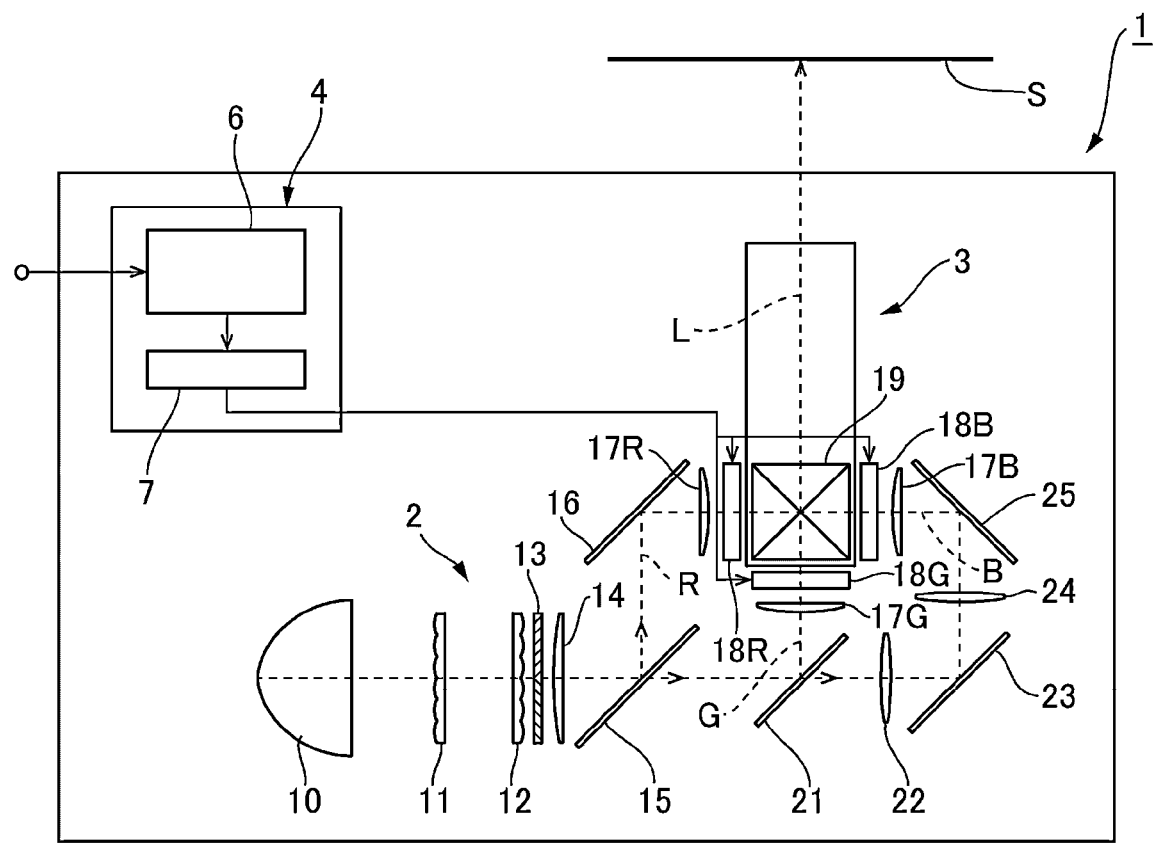
FIG. 1 is a schematic configuration diagram of a projector including a projection system.

FIG. 1 is a schematic configuration diagram of a projector including a projection system 3 according to the present disclosure. A projector 1 includes an image formation section 2, which generates a projection image to be projected on a screen S, the projection system 3, which enlarges the projection image and projects the enlarged image on the screen S, and a controller 4, which controls the action of the image formation section 2, as shown in FIG. 1.

Image Generation Optical System and Controller

The image formation section 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides the light flux from the light source 10 into a plurality of light fluxes. The lens elements of the first optical integration lens 11 focus the light flux from the light source 10 in the vicinity of the lens elements of the second optical integration lens 12.

The polarization converter 13 converts the light via the second optical integration lens 12 into predetermined linearly polarized light. The superimposing lens 14 superimposes images of the lens elements of the first optical integration lens 11 on one another in a display region of each of liquid crystal panels 18R, 18G, and 18B, which will be described later, via the second optical integration lens 12.

The image formation section 2 further includes a first dichroic mirror 15, a reflection mirror 16, a field lens 17R, and the liquid crystal panel 18R. The first dichroic mirror 15 reflects R light, which is part of the light rays incident via the superimposing lens 14, and transmits G light and B light, which are part of the light rays incident via the superimposing lens 14. The R light reflected off the first dichroic mirror 15 travels via the reflection mirror 16 and the field lens 17R and is incident on the liquid crystal panel 18R. The liquid crystal panel 18R is a light modulator. The liquid crystal panel 18R modulates the R light in accordance with an image signal to form a red projection image.

The image formation section 2 further includes a second dichroic mirror 21, a field lens 17G, and the liquid crystal panel 18G. The second dichroic mirror 21 reflects the G light, which is part of the light rays via the first dichroic mirror 15, and transmits the B light, which is part of the light rays via the first dichroic mirror 15. The G light reflected off the second dichroic mirror 21 passes through the field lens 17G and is incident on the liquid crystal panel 18G. The liquid crystal panel 18G is a light modulator. The liquid crystal panel 18G modulates the G light in accordance with an image signal to form a green projection image.

The image formation section 2 further includes a relay lens 22, a reflection mirror 23, a relay lens 24, a reflection mirror 25, a field lens 17B, and the liquid crystal panel 18B. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is a light modulator. The liquid crystal panel 18B modulates the B light in accordance with an image signal to form a blue projection image.

The liquid crystal panels 18R, 18G, and 18B surround a cross dichroic prism 19 in such a way that the liquid crystal panels 18R, 18G, and 18B face three sides of the cross dichroic prism 19. The cross dichroic prism 19, which is a prism for light combination, produces a projection image that is the combination of the light modulated by the liquid crystal panel 18R, the light modulated by the liquid crystal panel 18G, and the light modulated by the liquid crystal panel 18B.

The cross dichroic prism 19 forms part of the projection system 3. The projection system 3 enlarges and projects the projection images (images formed by liquid crystal panels 18R, 18G, and 18B) combined by the cross dichroic prism 19 on the screen S. The screen S is the enlargement-side image formation plane of the projection system 3.

The controller 4 includes an image processor 6, to which an external image signal, such as a video signal, is inputted, and a display driver 7, which drives the liquid crystal panels 18R, 18G, and 18B based on image signals outputted from the image processor 6.

The image processor 6 converts the image signal inputted from an external apparatus into image signals each containing grayscales and other factors of the corresponding color. The display driver 7 operates the liquid crystal panels 18R, 18G, and 18B based on the color projection image signals outputted from the image processor 6. The image processor 6 thus causes the liquid crystal panels 18R, 18G, and 18B to display projection images corresponding to the image signals.

Projection System

As Examples of the projection system 3 incorporated in the projector 1, a projection system 3A according to Example 1 and a projection system 3B according to Example 2 will be described below. In the following description and figures, the liquid crystal panels 18R, 18G, and 18B are referred to as liquid crystal panels 18.

Example 1

Figure 2:
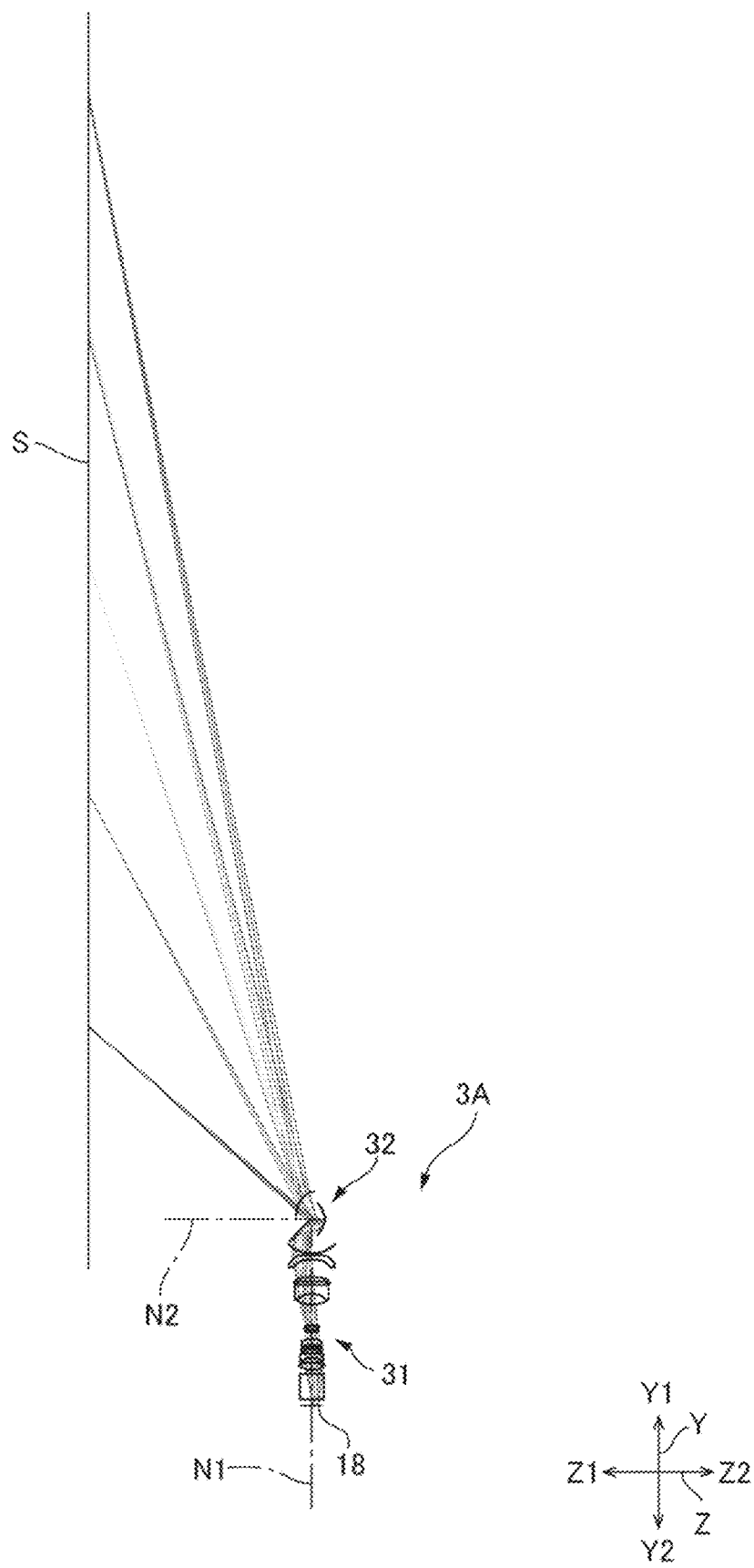
FIG. 2 is a light ray diagram diagrammatically showing the entire projection system according to Example 1.
Figure 3:
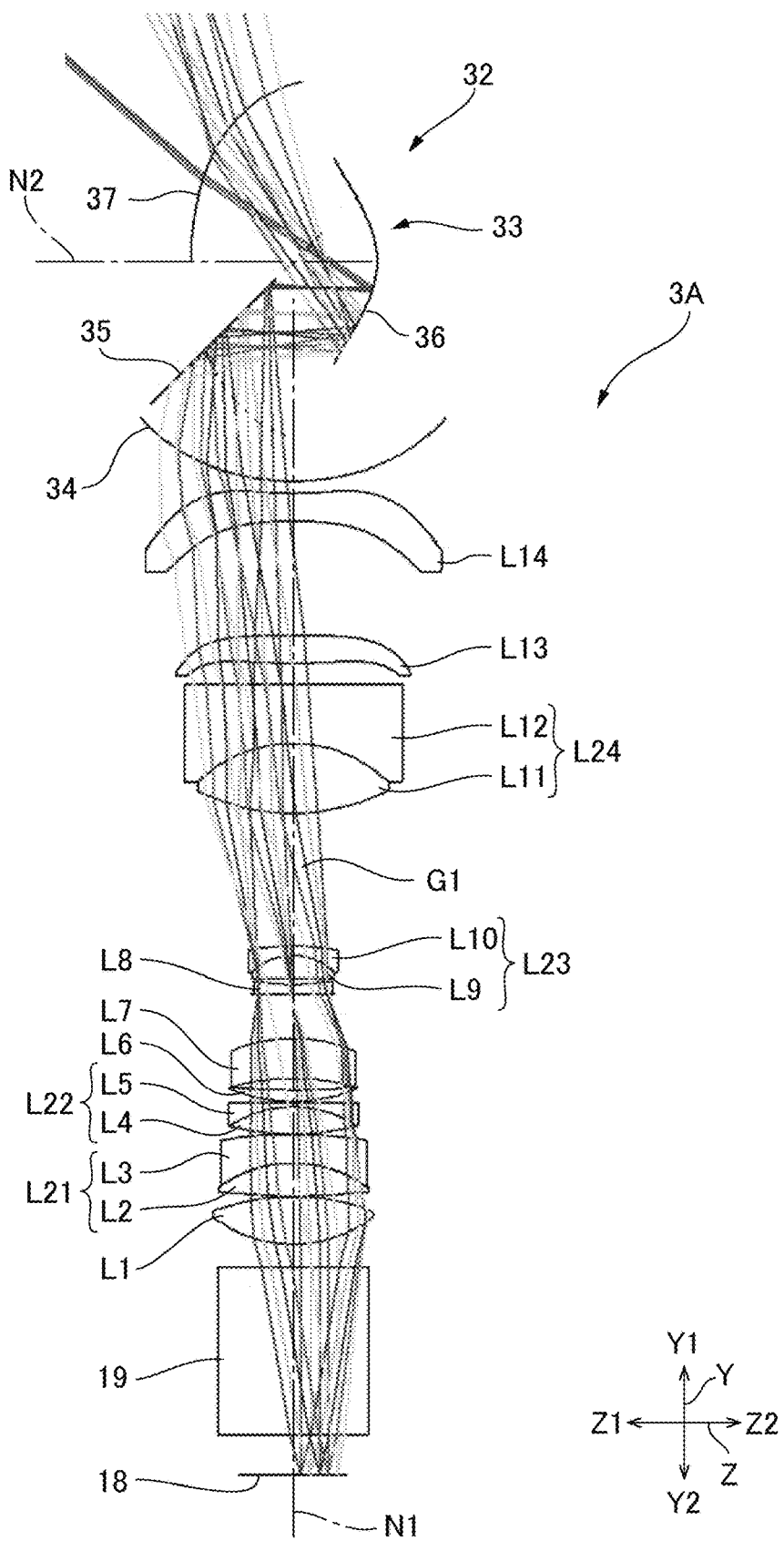
FIG. 3 is a light ray diagram of the projection system according to Example 1.
Figure 4:
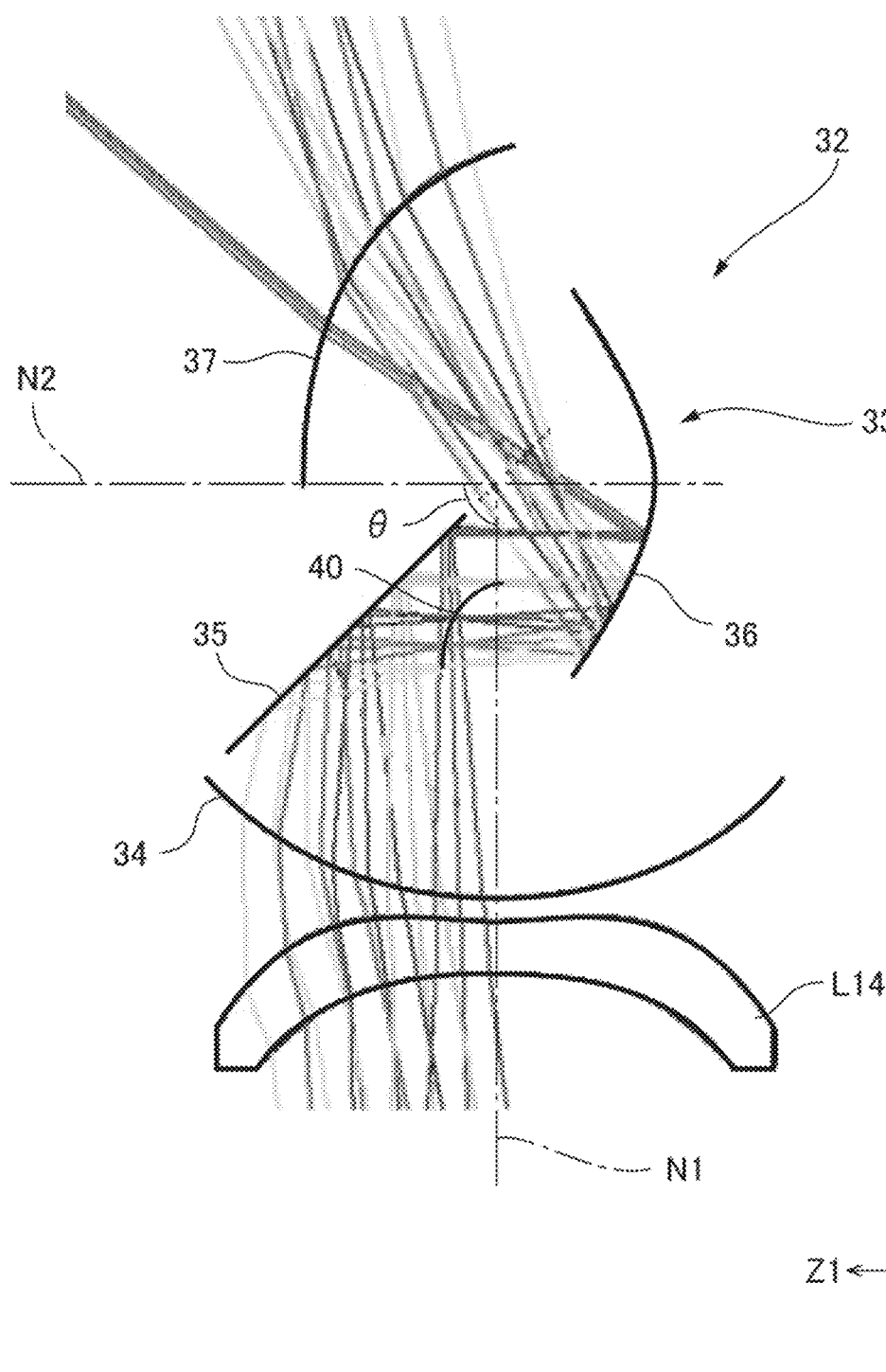
FIG. 4 is a light ray diagram of a second optical system of the projection system according to Example 1.
Figure 5:
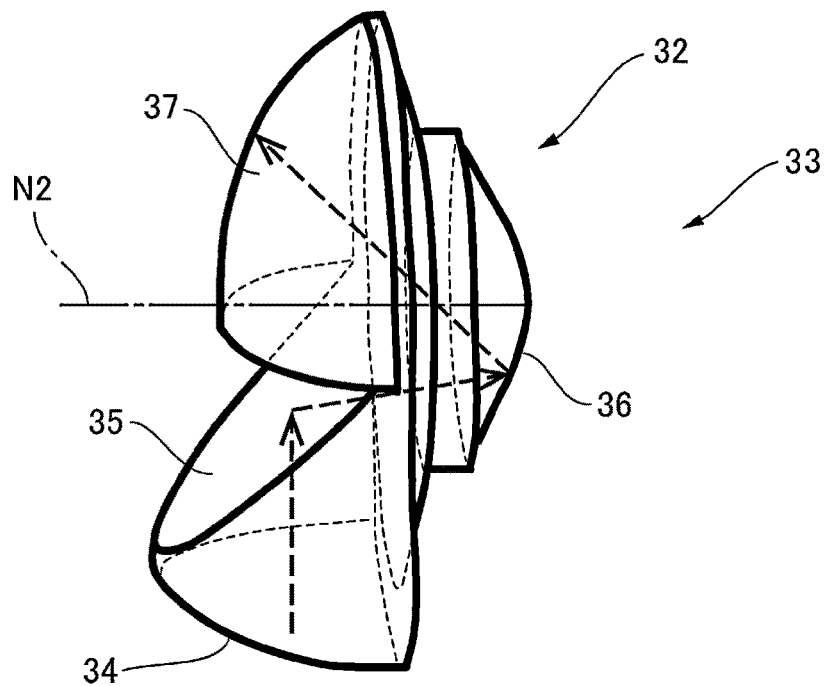
FIG. 5 is a perspective view of an optical element of the projection system according to Example 1.
Figure 6:
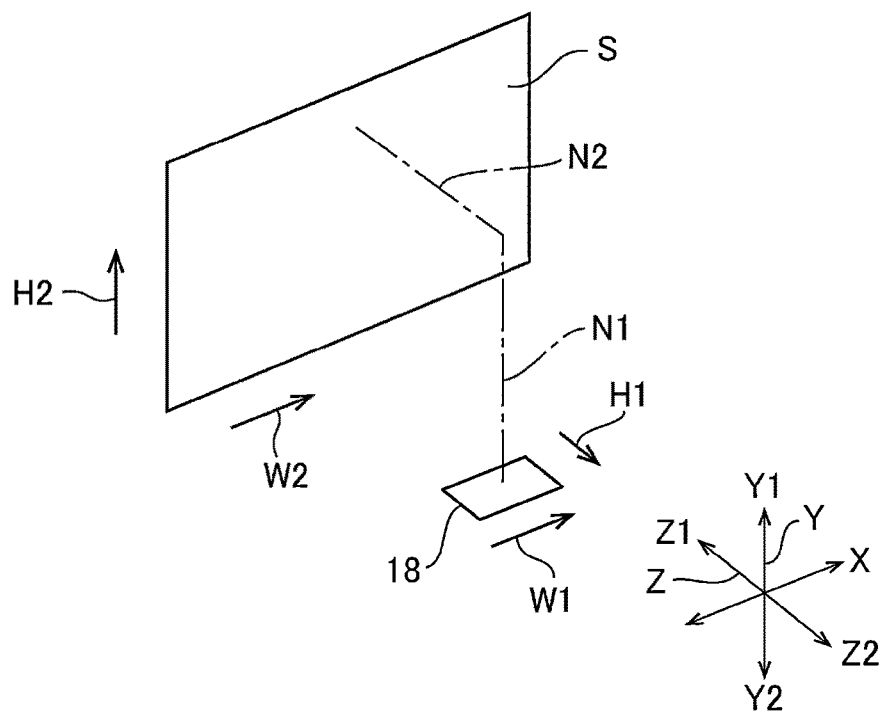
FIG. 6 is a descriptive diagram diagrammatically showing the optical axis of the projection system according to Example 1.

FIG. 2 is a light ray diagram diagrammatically showing the entire projection system 3A according to Example 1. FIG. 3 is a light ray diagram of the projection system 3A according to Example 1. FIG. 4 is a light ray diagram of a second optical system of the projection system 3A according to Example 1. In FIGS. 2, 3, and 4, the contour of an optical element that forms the second optical system is omitted. FIG. 5 is a perspective view of the optical element. FIG. 6 is a descriptive diagram diagrammatically showing the optical axis of the projection system 3A from the reduction-side image formation plane to the enlargement-side image formation plane.

The projection system 3A according to the present example is formed of a first optical system 31 and a second optical system 32 sequentially arranged from the reduction side toward the enlargement side, as shown in FIG. 3. The first optical system 31 is a refractive optical system including a plurality of lenses L1 to L14. The second optical system 32 includes a single optical element 33. The optical element 33 has a first transmissive surface 34, a first reflection surface 35, a second reflection surface 36, and a second transmissive surface 37 sequentially arranged from the reduction side toward the enlargement side, as shown in FIGS. 4 and 5. The first transmissive surface 34 has a convex shape protruding toward the reduction side. The first reflection surface 35 is a flat surface. That is, the first reflection surface 35 is a flat mirror. The second reflection surface 36 has a concave shape. The second transmissive surface 37 has a convex shape protruding toward the enlargement side. The optical element 33 is disposed on a first optical axis N1 of the first optical system 31. In the second optical system 32, a second optical axis N2 of the second reflection surface 36 intersects the first optical axis N1. In the present example, an angle θ between the first optical axis N1 and the second optical axis N2 is 90°, as shown in FIG. 4.

The liquid crystal panels 18 of the image formation section 2 are disposed in the reduction-side image formation plane of the projection system 3A, as shown in FIG. 3. The liquid crystal panels 18 form the projection images on one side of the first optical axis N1 of the first optical system 31. The screen S is disposed in the enlargement-side image formation plane of the projection system 3A, as shown in FIG. 2. A final image is projected on the screen S. The screen S is located on the side opposite the projection images formed by the liquid crystal panels 18 with respect to the first optical axis N1. An intermediate image 40 conjugate with the reduction-side image formation plane and the enlargement-side image formation plane is formed between the first optical system 31 and the second reflection surface 36 of the optical element 33, as shown in FIG. 4. The intermediate image 40 is an image conjugate with the final image but turned upside down. In the present example, the intermediate image 40 is formed inside the optical element 33. More specifically, the intermediate image 40 is formed between the first reflection surface 35 and the second reflection surface 36.

In the following description, three axes perpendicular to one another are called axes X, Y, and Z for convenience. The width direction of the screen S, which is the enlargement-side image format ion plane, is called an axis-X direction, the upward/downward direction of the screen S is called an axis-Y direction, and the direction perpendicular to the screen S is called an axis-Z direction. The axis-Z direction toward the side where the screen S is located is called a first direction Z1, and the axis-Z direction opposite the first direction Z1 is called a second direction Z2. The plane containing the second optical axis N2 of the second reflection surfaces 36 of the optical element 33 and extending in the axis-Y direction is called a plane YZ. FIGS. 2, 3, and 4 are each a light ray diagram in the plane YZ.

In the present example, the first optical axis N1 of the first optical system 31 extends in the Y-axis direction, as shown in FIG. 3. The second optical axis N2 of the second optical system 32 extends in the Z-axis direction. The liquid crystal panels 18 form the projection images on the side facing the second direction Z2 of the first optical axis N1 of the first optical system 31.

The first optical system 31 includes the cross dichroic prism 19 and 14 lenses L1 to L14, as shown in FIG. 3. The lenses L1 to L14 are arranged in the presented order from the reduction side toward the enlargement side. In the present example, the lenses L2 and L3 are bonded to each other into a first doublet L21. The lenses L4 and L5 are bonded to each other into a second doublet L22. The lenses L9 and L10 are bonded to each other into a third doublet L23. The lenses L11 and L12 are bonded to each other into a fourth doublet L24. An aperture that is not shown is disposed between the lens L7 and the lens L8.

In the first optical system 31, the lens L13 has positive power. The first optical system 31 as a whole has positive power. Therefore, between the first optical system 31 and the second optical system 32, the distance between the chief rays therein decreases as they approach the second optical system 32.

The optical element 33 is designed by using the second optical axis N2 of the second reflection surface 36 as the axis in the design stage. In other words, the second optical axis N2 is the design-stage optical axis of the second transmissive surface 37 and the second reflection surface 36. The first transmissive surface 34, the first reflection surface 35, and the second reflection surface 36 are located on a lower side Y2 of the second optical axis N2, and the second transmissive surface 37 is located on an upper side Y1 of the second optical axis N2, as shown in FIG. 4. The first transmissive surface 34, the first reflection surface 35, and the second transmissive surface 37 are shifted in the first direction Z1 from the first optical axis N1, and the second reflection surface 36 is shifted in the second direction Z2 from the first optical axis N1. The intermediate image 40 is located on the lower side Y2 of the second optical axis N2.

In the present example, the second reflection surface 36 and the second transmissive surface 37 of the optical element 33 each have a shape rotationally symmetric around the second optical axis N2, as shown in FIG. 5. The second reflection surface 36 and the second transmissive surface 37 are each provided within an angular range of 180° around the second optical axis N2. The first transmissive surface 34 is designed by using the first optical axis N1 as the axis in the design stage. The first transmissive surface 34 has a shape rotationally symmetric around the first optical axis N1. The first transmissive surface 34 is provided within an angular range of 180° around the first optical axis N1.

The first transmissive surface 34, the second reflection surface 36, and the second transmissive surface 37 of the optical element 33 are each an aspheric surface. The first reflection surface 35 and the second reflection surface 36 are each a reflection coating layer provided on the outer surface of the optical element 33. The first transmissive surface 34, the second reflection surface 36, and the second transmissive surface 37 may instead each be a free-form surface. In this case, the free-form surfaces are designed with respect to the respective optical axes as the design-stage axis. In this case, when the second reflection surface is a free-form surface, the second optical axis N2 is the design-stage axis of the second reflection surface.

The first reflection surface 35 reflects the light flux having passed through the first transmissive surface 34 in a direction that intersects the first optical axis N1, as indicated by the chain-line arrow in FIG. 5. In the present example, the first reflection surface 35 deflects the light flux having passed through the first transmissive surface 34 by 90° in such a way that the deflected light flux travels in the second direction Z2, which is the direction away from the screen S. The light flux reflected off the first reflection surface 35 is reflected off the second reflection surface 36 toward the upper side Y1 in the first direction Z1, which approaches the screen S. The light flux reflected off the second reflection surface 36 and passing through the second transmissive surface 37 exits out of the optical element 33 toward the upper side Y1 and reaches the screen S.

In the projection system 3A, the reduction-side image formation plane intersects the enlargement-side image formation plane, as shown in FIG. 6. That is, the reduction-side image formation plane, where the liquid crystal panels 18 form the projection images, extends along the plane XZ. The lengthwise direction of the liquid crystal panels 18, that is, a width direction W1 of the projection images extends in the axis-X direction. The widthwise direction of the liquid crystal panels 18, that is, a height direction H1 of the projection images extends in the axis-Z direction. The screen S, on which the final image is formed, extends along the plane XY. The lengthwise direction of the screen S, that is, a width direction W2 of the final image extends in the axis-X direction. The widthwise direction of the screen S, that is, a height direction H2 of the final image extends in the axis-Y direction.

Lens Data

Data on the lenses of the projection system 3A are listed below. The surfaces of the lenses are numbered sequentially from the enlargement side toward the reduction side. An aspheric surface has a surface number preceded by *. Reference characters are given to the components of the projection system. Reference character r denotes the radius of curvature. Reference character d denotes the axial intersurface distance. Reference character nd denotes the refractive index. Reference character vd denotes the Abbe number. Reference character Y denotes the effective radius. Reference characters r, d, and Y are each expressed in millimeters. The projection distance of the projection system 3A is the distance from the surface having the surface number of 31, which is the second transmissive surface 37, to the screen S.

The decenter and bend factor α of the surface having the surface number of 29, that is, the first reflection surface 35 is −45. The aspheric coefficients of each of the aspheric surfaces are listed below.

| Surface number | 24 |
|---|---|
| Conic constant | 5.747129E+00 |
| Fourth-order coefficient | −1.773701E−05 |
| Sixth-order coefficient | 2.099464E−08 |
| Eighth-order coefficient | −5.487779E−11 |
| Tenth-order coefficient | 7.584515E−15 |

| Surface number | 25 |
|---|---|
| Conic constant | −1E+02 |
| Fourth-order coefficient | −1.423867E−05 |
| Sixth-order coefficient | 1.409802E−08 |
| Eighth-order coefficient | −4.012394E−11 |
| Tenth-order coefficient | 8.047043E−15 |

| Surface number | 26 |
|---|---|
| Conic constant | 5.86971E+00 |
| Fourth-order coefficient | −6.931921E−06 |
| Sixth-order coefficient | −2.037596E−08 |
| Eighth-order coefficient | 2.860225E−11 |
| Tenth-order coefficient | −4.032263E−15 |

| Surface number | 27 |
|---|---|
| Conic constant | 5.341384E−01 |
| Fourth-order coefficient | −3.273916E−05 |
| Sixth-order coefficient | 1.751897E−08 |

| Surface number | Name | r | d | nd | vd | Mode | Y |
|---|---|---|---|---|---|---|---|
| Object plane | 18 | 0 | 8.5 | | | Refraction | |
| 1 | 19 | 0 | 35.95 | 1.51633 | 64.14 | Refraction | 12.573 |
| 2 | | 0 | 5 | | | Refraction | 14.999 |
| 3 | L01 | 29.33178 | 10.078656 | 1.442044 | 86.63 | Refraction | 16 |
| 4 | | −46.7571 | 0.1 | | | Refraction | 15.852 |
| 5 | L02 | 148.79233 | 7.071831 | 1.772054 | 47.71 | Refraction | 14.902 |
| 6 | L03 | −26.54503 | 6.108227 | 2.0196 | 20.783 | Refraction | 14.521 |
| 7 | | −95.30317 | 0.1 | | | Refraction | 13.827 |
| 8 | L04 | 57.12601 | 5.870101 | 1.494958 | 52.92 | Refraction | 12.989 |
| 9 | L05 | −24.31043 | 1 | 2.0508 | 26.942 | Refraction | 12.77 |
| 10 | | −887.31514 | 0.2 | | | Refraction | 12.691 |
| 11 | L06 | 37.22942 | 2.436591 | 1.986125 | 16.48 | Refraction | 12.565 |
| 12 | | 155.01669 | 2.483493 | | | Refraction | 12.414 |
| 13 | L07 | −45.82387 | 8.6095 | 1.526239 | 38.78 | Refraction | 12.314 |
| 14 | | −32.53128 | 9.5 | | | Refraction | 11.559 |
| Aperture plane | | 0 | 0.1 | | | Refraction | 7.5 |
| 16 | L08 | −323.72495 | 2 | 2.0508 | 26.942 | Refraction | 7.5 |
| 17 | | 42.89214 | 1.15812 | | | Refraction | 7.578 |
| 18 | L09 | 1757.31503 | 4.943349 | 1.840029 | 18.61 | Refraction | 7.709 |
| 19 | L10 | −12.35292 | 2 | 2.0508 | 26.942 | Refraction | 7.982 |
| 20 | | −48.32828 | 28.476179 | | | Refraction | 8.812 |
| 21 | L11 | 45.45967 | 15 | 1.686174 | 23.14 | Refraction | 19 |
| 22 | L12 | −29.191 | 12.671948 | 1.990031 | 16.9 | Refraction | 19.076 |
| 23 | | −3485.13836 | 4.481986 | | | Refraction | 21.906 |
| *24 | L13 | 105.64407 | 6 | 1.531131 | 55.75 | Refraction | 22.487 |
| *25 | | −519.77235 | 24.526951 | | | Refraction | 23.721 |
| *26 | L14 | −78.70625 | 6 | 1.531131 | 55.75 | Refraction | 27.151 |
| *27 | | 66.20602 | 2.620232 | | | Refraction | 30.053 |
| *28 | 34 | 57.65154 | 47 | 1.509398 | 56.47 | Refraction | 30.974 |
| 29 | 35 | 0 | −18 | 1.509398 | 56.47 | Reflection | 41.343 |
| *30 | 36 | 17.73917 | 40 | 1.509398 | 56.47 | Reflection | 20.636 |
| *31 | 37 | −60 | 286 | | | Refraction | 37.407 |
| Image plane | S | 0 | 0 | | | Refraction | 1897.748 |

-continued

| | |
|---|---|
| Eighth-order coefficient | −7.121867E−12 |
| Tenth-order coefficient | 1.654097E−15 |

| Surface number | 28 |
|---|---|
| Conic constant | 1.933343E+00 |
| Fourth-order coefficient | 3.63149E−06 |
| Sixth-order coefficient | −9.290606E−09 |
| Eighth-order coefficient | 1.233337E−11 |
| Tenth-order coefficient | −7.387416E−15 |

| Surface number | 30 |
|---|---|
| Conic constant | −3.045767E+00 |
| Fourth-order coefficient | 1.087866E−05 |
| Sixth-order coefficient | −3.933264E−08 |
| Eighth-order coefficient | 6.851884E−11 |
| Tenth-order coefficient | −6.380783E−14 |

| Surface number | 31 |
|---|---|
| Conic constant | 1.393652E+00 |
| Fourth-order coefficient | 1.213214E−06 |
| Sixth-order coefficient | −3.767339E−09 |
| Eighth-order coefficient | 2.904918E−12 |
| Tenth-order coefficient | −9.240926E−16 |

Effects and Advantages

The projection system 3A according to the present example includes the first optical system 31 and the second optical system 32 sequentially arranged from the reduction side toward the enlargement side. The second optical system 32 includes the optical element 33 having the first transmissive surface 34, the first reflection surface 35, the second reflection surface 36, and the second transmissive surface 37 sequentially arranged from the reduction side toward the enlargement side. The second reflection surface 36 has a concave shape. The second optical axis N2 of the second reflection surface 36 intersects the first optical axis N1 of the first optical system 31.

In the second optical system 32 in the present example, the second transmissive surface 37 can refract the light flux reflected off the second reflection surface 36. The projection distance of the projection system 3A can therefore be shortened as compared with a case where the second optical system 32 has only the second reflection surface 36. In other words, the projection system 3A according to the present example can have a short focal length as compared with the case where the second optical system 32 has only the second reflection surface 36.

The projection system 3A according to the present example, which includes the first reflection surface 35, readily directs the light flux that exits out of the second optical system 32 in a direction in which the light flux does not interfere with the first optical system 31.

Further, in the present example, in which the single optical element has the first reflection surface 35 and the second reflection surface 36, the second optical system 32 can be compact as compared with a case where the two reflection surfaces are provided to surfaces of separate optical elements. Moreover, the first reflection surface 35 and the second reflection surface 36 can be formed integrally with each other and can therefore be formed with high precision.

The first optical axis N1 of the first optical system 31 extends in the axis-Y direction in the plane YZ, and the second optical axis N2 of the second optical system 32 extends in the axis-Z direction in the plane YZ. The projection system 3A is therefore compact in the axis-X and axis-Z directions.

Further, in the present example, since the optical element 33 has the convex second transmissive surface 37 protruding toward the enlargement side, an increase in the size of the second reflection surface 36 disposed on the enlargement side of the intermediate image 40 can be suppressed. That is, in the second optical system 32, the second transmissive surface 37, which can refract the light flux, can suppress inclination of the intermediate image 40, which is conjugate with the enlargement-side image formation plane, with respect to the second optical axis N2 and the resultant increase in the size of the intermediate image 40. An increase in the size of the second reflection surface 36, which is located on the enlargement side of the intermediate image 40, can therefore be suppressed.

The intermediate image 40 is located between the first reflection surface 35 and the second reflection surface 36 of the optical element 33. The first optical system 31 and the optical element 33 are therefore allowed to approach each other as compared with a case where the intermediate image 40 is formed between the first optical system 31 and the optical element 33. The size of the projection system 3A can thus be reduced in the axis-Y and axis-Z directions.

In the optical element 33, the first light transmissive surface 34, which is located on the reduction side of the intermediate image 40, is an aspheric surface, whereby occurrence of aberrations at the intermediate image 40 can be suppressed. The second reflection surface 36 and the second transmissive surface 37 of the optical element 33 are each an aspheric surface. Occurrence of aberrations can therefore be suppressed in the enlargement-side image formation plane.

Further, in the optical element 33, the first transmissive surface 34 has a shape rotationally symmetric around the first optical axis N1, and the second reflection surface 36 and the second transmissive surface 37 each have a shape rotationally symmetric around the second optical axis N2. The optical element 33 is therefore readily manufactured as compared with a case where the surfaces are not rotationally symmetric.

In the present example, between the first optical system 31 and the second optical system 32, the distance between the chief rays therein decreases as they approach the second optical system 32. Therefore, the intermediate image 40 can be readily formed, and the size of the intermediate image 40 can be reduced. The size of the second reflection surface 36, which is located on the enlargement side of the intermediate image 40, is therefore readily reduced.

Figure 7:
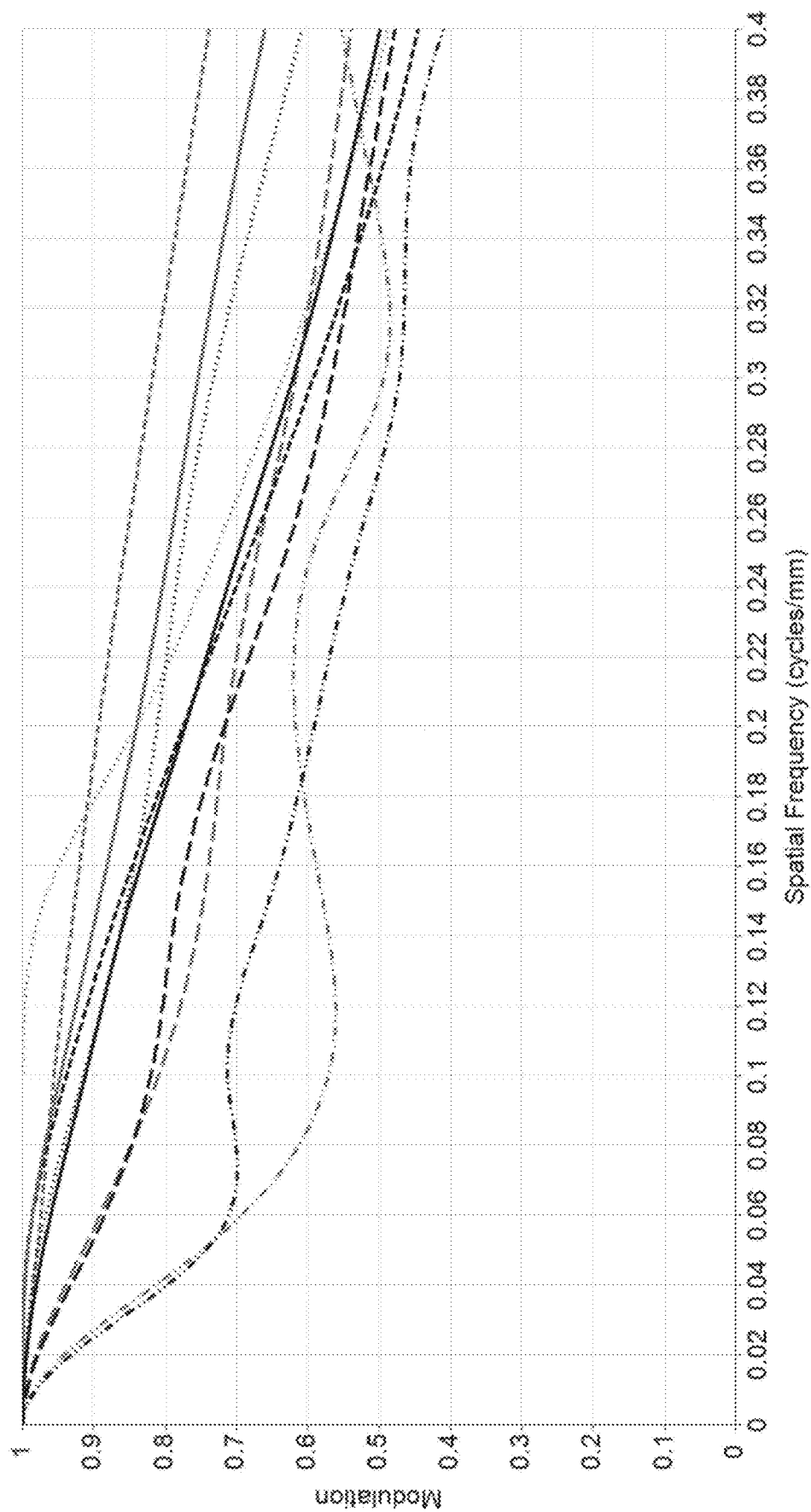
FIG. 7 shows the enlargement-side MTF of the projection system according to Example 1.
Figure 8:
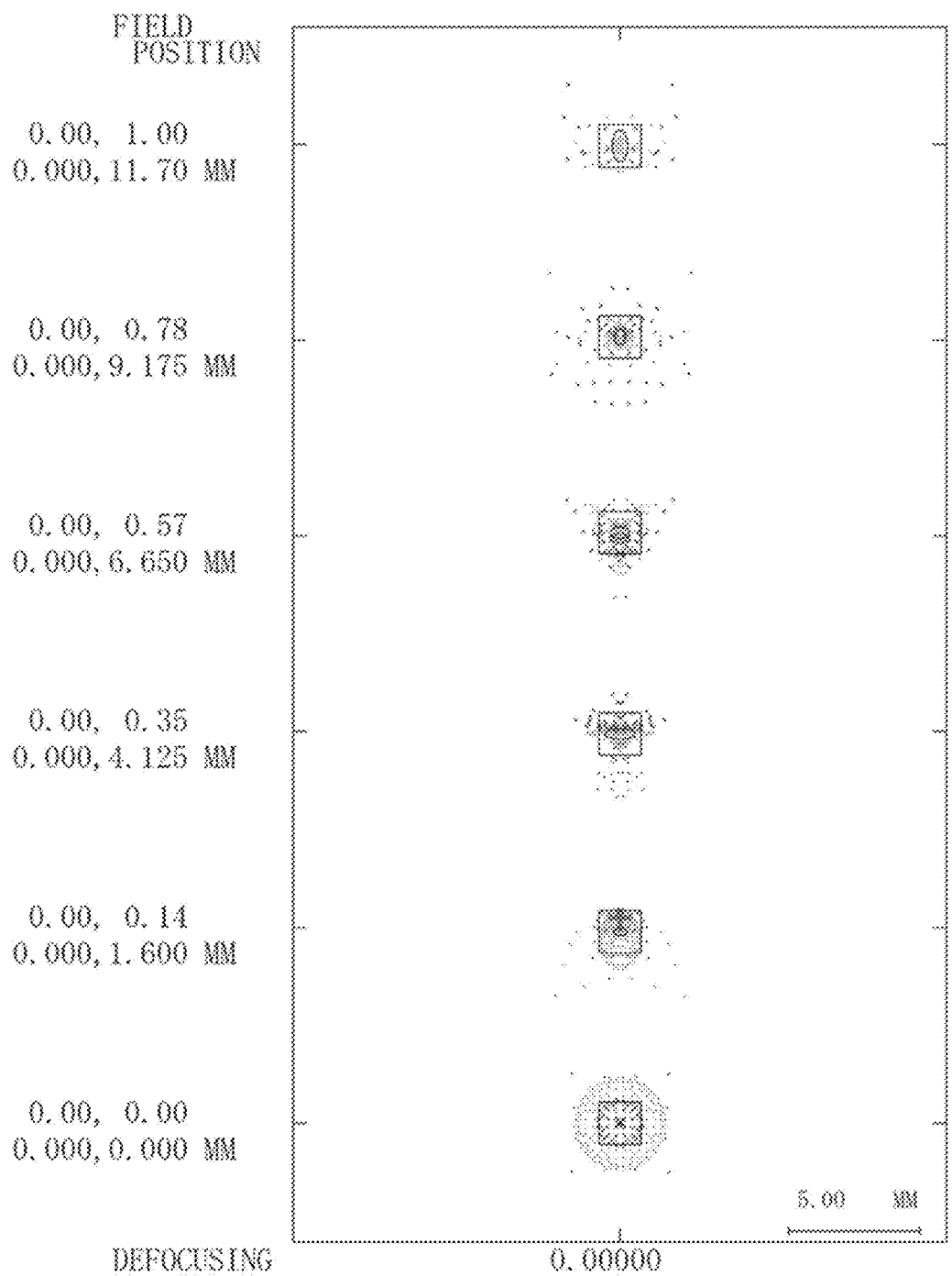
FIG. 8 is a spot diagram of a light spot produced by the projection system according to Example 1.

FIG. 7 shows the enlargement-side MTF of the projection system 3A. The horizontal axis of FIG. 7, which shows the MTF, represents the spatial frequency. The vertical axis of FIG. 7 represents a contrast reproduction ratio. FIG. 8 is a spot diagram showing how well the light is collected on an image height position basis. The projection system 3A provides high resolution, as shown in FIGS. 7 and 8.

Example 2

Figure 9:
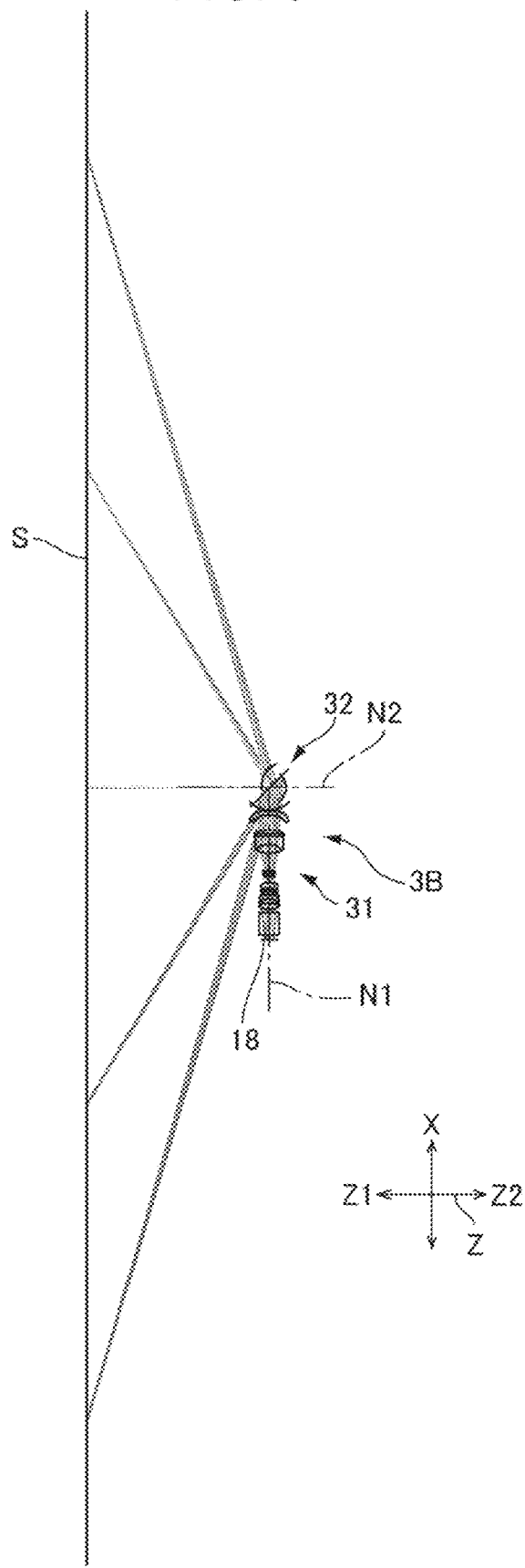
FIG. 9 is a light ray diagram diagrammatically showing the entire projection system according to Example 2.
Figure 10:
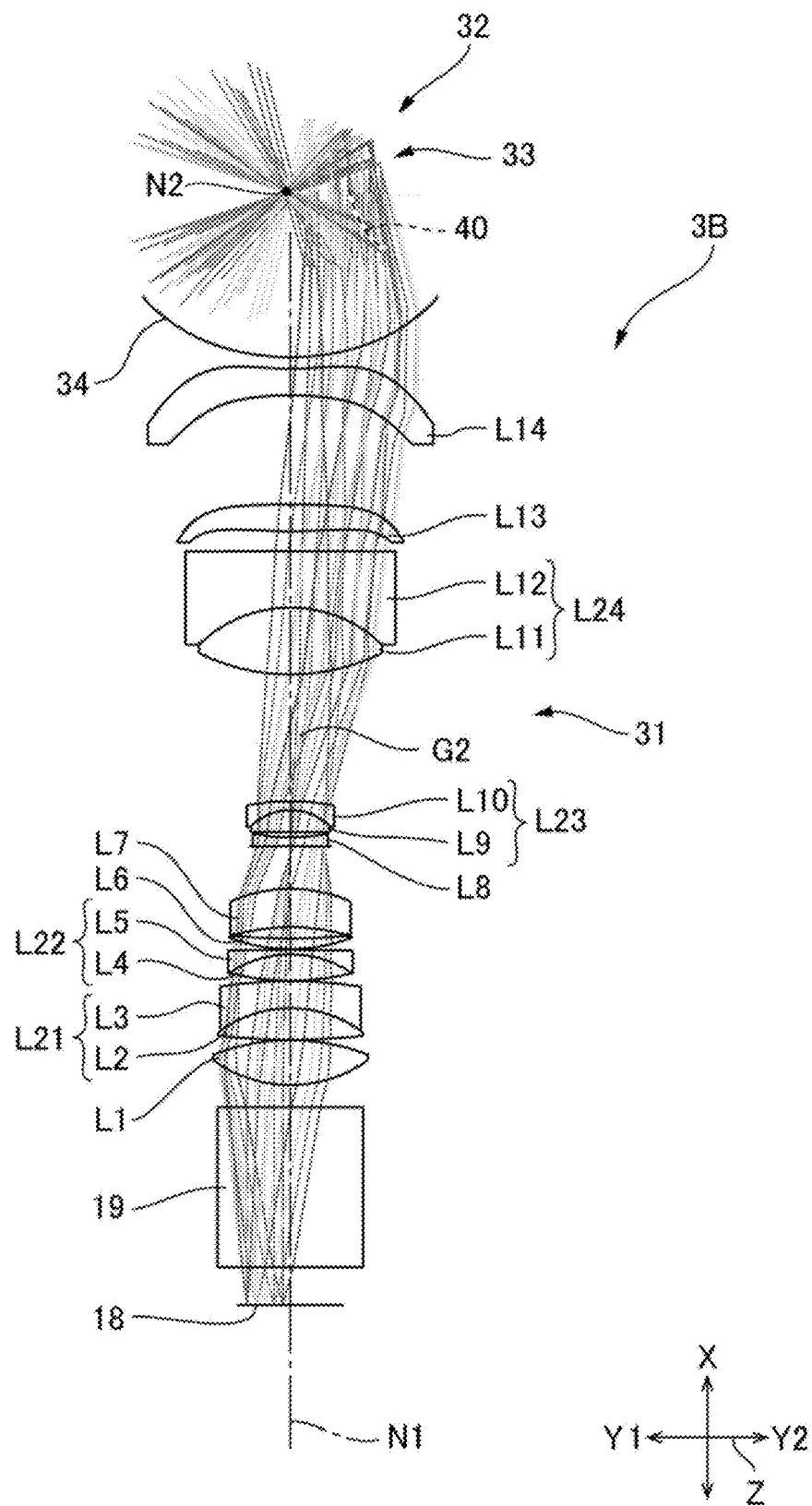
FIG. 10 is a light ray diagram of the projection system according to Example 2.
Figure 11:
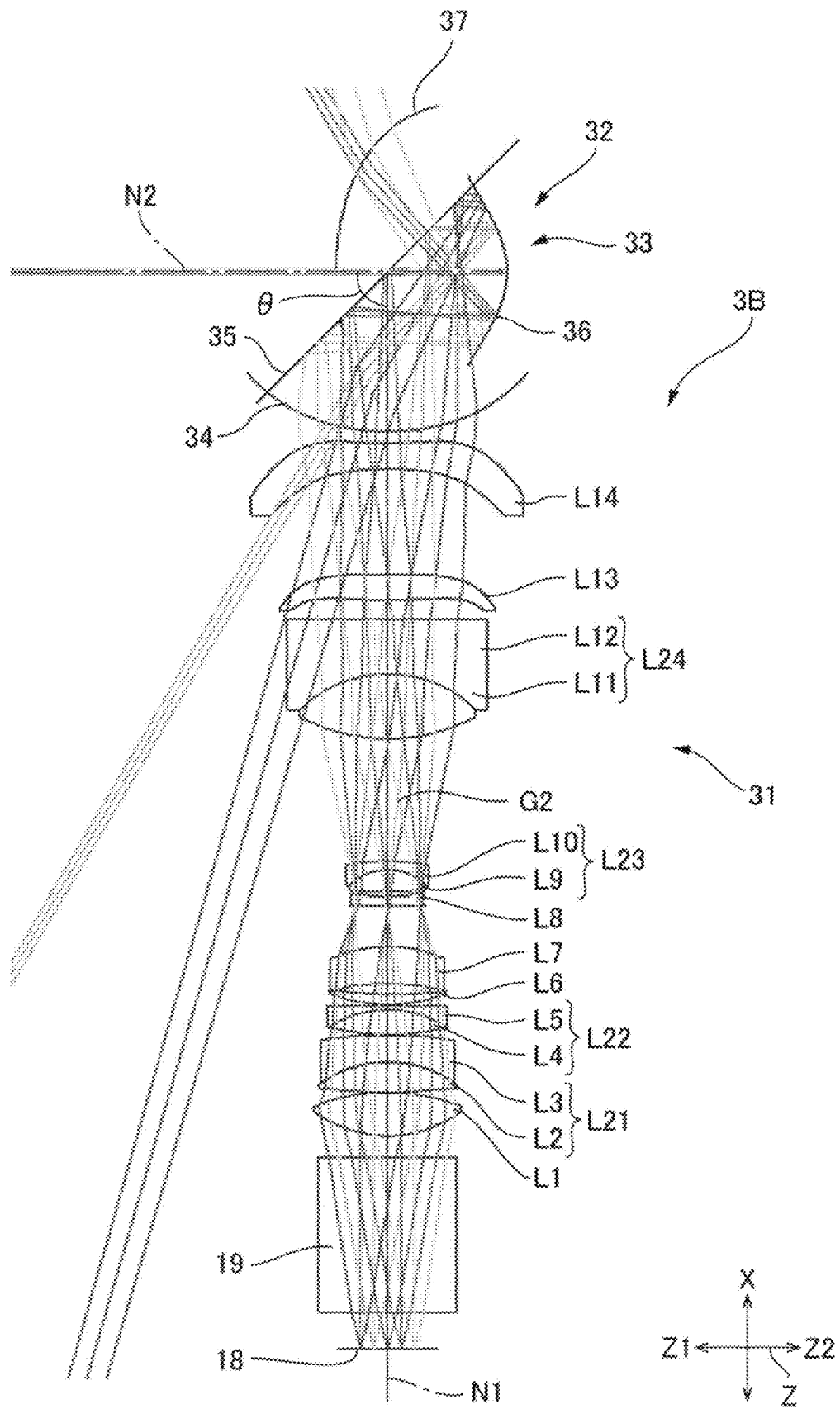
FIG. 11 is a light ray diagram of the projection system according to Example 2 viewed from above.
Figure 12:
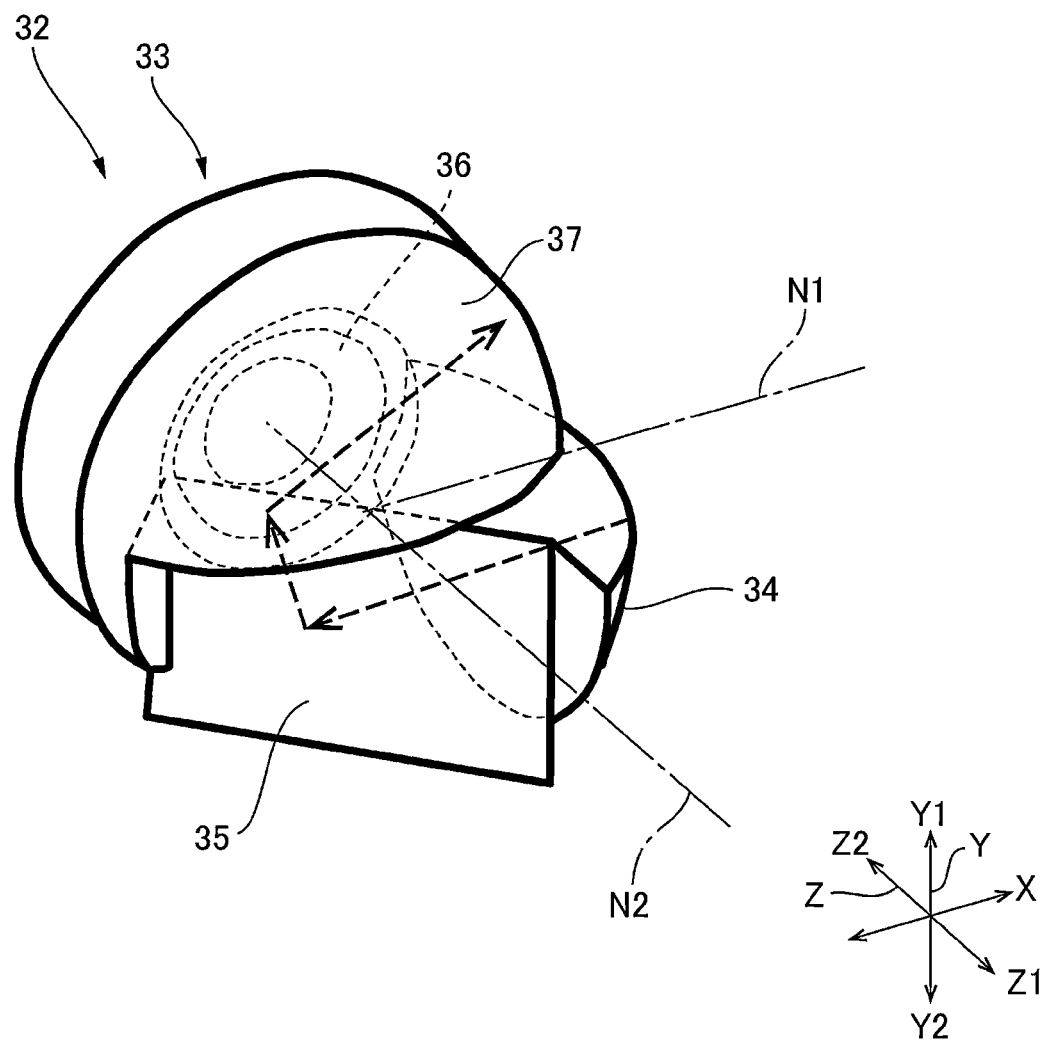
FIG. 12 is a perspective view of the optical element of the projection system according to Example 2.
Figure 13:
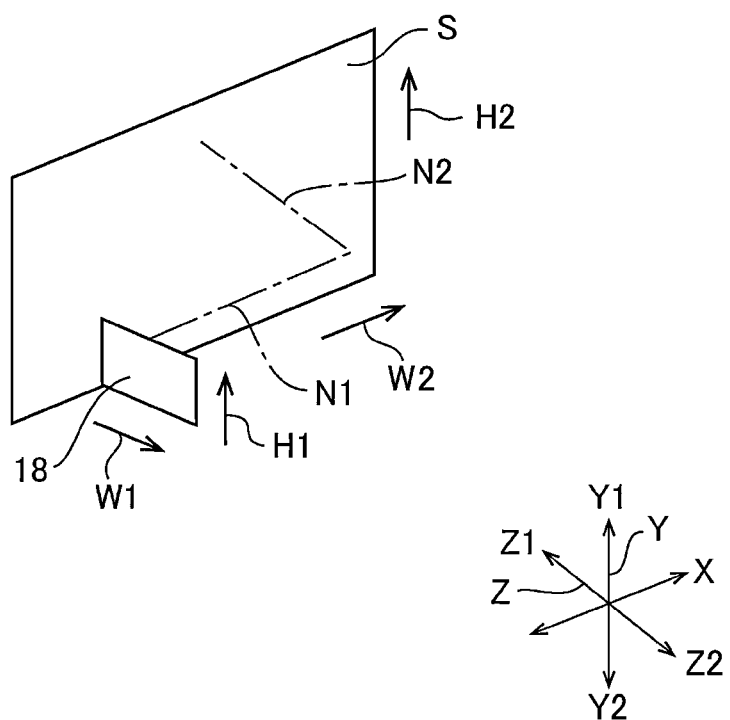
FIG. 13 is a descriptive diagram diagrammatically showing the optical axis of the projection system according to Example 2.

FIG. 9 is a light ray diagram diagrammatically showing the entirety of a projection system 3B according to Example 2. In FIG. 9, the projection system 3B according to Example 2 is viewed from upper side Y1. FIG. 10 is a light ray diagram of the projection system 3B according to Example 2 viewed in the axis-Z direction perpendicular to the screen S. FIG. 11 is a light ray diagram of the projection system 3B viewed from upper side Y1. FIGS. 9 and 11 are light ray diagrams in the plane XZ containing the second optical axis N2 of the second optical system 32 and extending in the axis-X direction. In FIGS. 9, 10, and 11, the contour of the optical element 33, which forms the second optical system 32, is omitted. FIG. 12 is a perspective view of the optical element 33 according to Example 2. FIG. 13 is a descriptive diagram diagrammatically showing the optical axis of the projection system 3B from the reduction-side image formation plane to the enlargement-side image formation plane.

The projection system 3B according to the present example includes the first optical system 31 and the second optical system 32 sequentially arranged from the reduction side toward the enlargement side, as shown in FIGS. 10 and 11. The first optical system 31 is a refractive optical system including a plurality of lenses L1 to L14. The first optical axis N1 of the first optical system 31 extends in the axis-X direction parallel to the screen S, which is the enlargement-side image formation plane.

The second optical system 32 includes the single optical element 33. The optical element 33 has the first transmissive surface 34, the first reflection surface 35, the second reflection surface 36, and the second transmissive surface 37 sequentially arranged from the reduction side toward the enlargement side. The first transmissive surface 34 has a convex shape protruding toward the reduction side. The second reflection surface 36 has a concave shape. The first reflection surface 35 is a flat surface. That is, the first reflection surface 35 is a flat mirror. The second reflection surface 36 has a concave shape. The second transmissive surface 37 has a convex shape protruding toward the enlargement side. The optical element 33, which forms the second optical system 32, is disposed on the first optical axis N1 of the first optical system 31. In the second optical system 32, the second optical axis N2 of the second reflection surface 36 intersects the first optical axis N1. The angle $\partial$ between the first optical axis N1 and the second optical axis N2 is 90°, as shown in FIG. 11. The second optical axis N2 extends in the Z-axis direction.

The liquid crystal panels 18 of the image formation section 2 are disposed in the reduction-side image formation plane of the projection system 3B. The liquid crystal panels 18 form the projection images on the upper side Y1 of the first optical axis N1 of the first optical system 31, as shown in FIG. 10. The screen S is disposed in the enlargement-side image formation plane of the projection system 3B, as shown in FIG. 9. The final image is projected on the screen S. The screen S is located on the upper side Y1 of the first optical axis N1. The intermediate image 40 conjugate with the reduction-side image formation plane and the enlargement-side image formation plane is formed between the first optical system 31 and the second reflection surface 36 of the optical element 33, as shown in FIG. 10. The intermediate image 40 is an image conjugate with the final image but turned upside down. In the present example, the intermediate image 40 is formed inside the optical element 33. More specifically, the intermediate image 40 is formed between the first reflection surface 35 and the second reflection surface 36. The intermediate image 40 is located on the lower side Y2 of the first optical axis N1.

The first optical system 31 includes the cross dichroic prism 19 and 14 lenses L1 to L14, as shown in FIGS. 10 and 11. The lenses L1 to L14 are arranged in the presented order from the reduction side toward the enlargement side. In the present example, the lenses L2 and L3 are bonded to each other into the first doublet L21. The lenses L4 and L5 are bonded to each other into the second doublet L22. The lenses L9 and L10 are bonded to each other into the third doublet L23. The lenses L11 and L12 are bonded to each other into the fourth doublet L24. An aperture that is not shown is disposed between the lens L7 and the lens L8.

In the first optical system 31, the lens L13 has positive power. The first optical system 31 as a whole has positive power. Therefore, between the first optical system 31 and the second optical system 32, the distance between the chief rays therein decreases as they approach the second optical system 32.

The optical element 33 is designed by using the second optical axis N2 of the second reflection surface 36 as the axis in the design stage. In other words, the second optical axis N2 is the design-stage optical axis of the second transmissive surface 37 and the second reflection surface 36. The first transmissive surface 34, the first reflection surface 35, and the second reflection surface 36 are located on the lower side Y2 of the second optical axis N2, as shown in FIG. 12. The second transmissive surface 37 is located on the upper side Y1 of the second optical axis N2. The first transmissive surface 34, the first reflection surface 35, and the second transmissive surface 37 are shifted in the first direction Z1 from the first optical axis N1, and the second reflection surface 36 is shifted in the second direction Z2 from the first optical axis N1. The first reflection surface 35 and the second reflection surface 36 face each other in the axis-Z direction.

The first transmissive surface 34, the second reflection surface 36, and the second transmissive surface 37 of the optical element 33 each have a shape rotationally symmetric around the second optical axis N2. The first transmissive surface 34, the second reflection surface 36, and the second transmissive surface 37 are each provided within the angular range of 180° around the second optical axis N2.

The first transmissive surface 34, the second reflection surface 36, and the second transmissive surface 37 of the optical element 33 are each an aspheric surface. The first reflection surface 35 and the second reflection surface 36 are each a reflection coating layer provided on the outer surface of the optical element 33. The first transmissive surface 34, the second reflection surface 36, and the second transmissive surface 37 may instead each be a free-form surface. In this case, the second reflection surface 36 and the second transmissive surface 37 are designed by using the second optical axis N2 as the design-stage axis. The first transmissive surface 34 is designed by using the first optical axis N1 as the axis in the design stage.

The first reflection surface 35 reflects the light flux having passed through the first transmissive surface 34 in a direction that intersects the first optical axis N1, as indicated by the chain-line arrow in FIG. 12. The first reflection surface 35 deflects the light flux having passed through the first transmissive surface 34 by 90° in such a way that the deflected light flux travels in the second direction Z2, which is the direction away from the screen S, as shown in FIG. 11. The light flux reflected off the first reflection surface 35 is reflected off the second reflection surface 36 in the first direction Z1 toward the upper side Y1. The light flux reflected off the second reflection surface 36 and passing through the second transmissive surface 37 exits out of the optical element 33 toward the upper side Y1 and reaches the screen S.

In the projection system 3B, the reduction-side image formation plane intersects the enlargement-side image formation plane, as shown in FIG. 13. That is, the reduction-side image formation plane, where the liquid crystal panels 18 form the projection images, extends along the plane YZ. The lengthwise direction of the liquid crystal panels 18, that is, the width direction W1 of the projection images extends in the axis-Z direction. The widthwise direction of the liquid crystal panels 18, that is, the height direction H1 of the projection images extends in the axis-Y direction. The screen S, on which the final image is formed, extends along the plane XY. The lengthwise direction of the screen S, that is, the width direction W2 of the final image extends in the axis-X direction. The widthwise direction of the screen S, that is, the height direction H2 of the final image extends in the axis-Y direction.

Lens Data

Data on the lenses of the projection system 3B are listed below. The projection distance of the projection system 3B is the distance from the surface having the surface number of 30 to the screen S.

32 includes the optical element 33 having the first transmissive surface 34, the first reflection surface 35, the second reflection surface 36, and the second transmissive surface 37 sequentially arranged from the reduction side toward the enlargement side. The second reflection surface 36 has a concave shape. The second optical axis N2 of the second reflection surface 36 intersects the first optical axis N1 of the first optical system 31.

In the second optical system 32 of the projection system 3B according to the present example, the second transmissive surface 37 can refract the light flux reflected off the second reflection surface 36. The projection distance of the projection system 3B can therefore be shortened as compared with the case where the second optical system 32 has only the second reflection surface 36. In other words, the

| Surface number | Name | r | d | nd | vd | Mode | Y |
|---|---|---|---|---|---|---|---|
| Object plane | 18 | 0 | 8.5 | | | Refraction | |
| 1 | 19 | 0 | 35.95 | 1.51633 | 64.14 | Refraction | 12.573 |
| 2 | | 0 | 5 | | | Refraction | 14.999 |
| 3 | L01 | 29.33178 | 10.078656 | 1.442044 | 86.63 | Refraction | 16 |
| 4 | | −46.7571 | 0.1 | | | Refraction | 15.852 |
| 5 | L02 | 148.79233 | 7.071831 | 1.772054 | 47.71 | Refraction | 14.902 |
| 6 | L03 | −26.54503 | 6.108227 | 2.0196 | 20.783 | Refraction | 14.521 |
| 7 | | −95.30317 | 0.1 | | | Refraction | 13.827 |
| 8 | L04 | 57.12601 | 5.870101 | 1.494958 | 52.92 | Refraction | 12.989 |
| 9 | L05 | −24.31043 | 1 | 2.0508 | 26.942 | Refraction | 12.77 |
| 10 | | −887.31514 | 0.2 | | | Refraction | 12.691 |
| 11 | L06 | 37.22942 | 2.436591 | 1.986125 | 16.48 | Refraction | 12.565 |
| 12 | | 155.01669 | 2.483493 | | | Refraction | 12.414 |
| 13 | L07 | −45.82387 | 8.6095 | 1.526239 | 38.78 | Refraction | 12.314 |
| 14 | | −32.53128 | 9.5 | | | Refraction | 11.559 |
| Aperture plane | | 0 | 0.1 | | | Refraction | 7.5 |
| 16 | L08 | −323.72495 | 2 | 2.0508 | 26.942 | Refraction | 7.5 |
| 17 | | 42.89214 | 1.15812 | | | Refraction | 7.578 |
| 18 | L09 | 1757.31503 | 4.943349 | 1.840029 | 18.61 | Refraction | 7.709 |
| 19 | L10 | −12.35292 | 2 | 2.0508 | 26.942 | Refraction | 7.982 |
| 20 | | −48.32828 | 28.476179 | | | Refraction | 8.812 |
| 21 | L11 | 45.45967 | 15 | 1.686174 | 23.14 | Refraction | 19 |
| 22 | L12 | −29.191 | 12.671948 | 1.990031 | 16.9 | Refraction | 19.076 |
| 23 | | −3485.13836 | 4.481986 | | | Refraction | 21.906 |
| *24 | L13 | 105.64407 | 6 | 1.531131 | 55.75 | Refraction | 22.487 |
| *25 | | −519.77235 | 24.526951 | | | Refraction | 23.721 |
| *26 | L14 | −78.70625 | 6 | 1.531131 | 55.75 | Refraction | 27.151 |
| *27 | | 66.20602 | 2.620232 | | | Refraction | 30.053 |
| *28 | 34 | 57.65154 | 37 | 1.509398 | 56.47 | Refraction | 30.974 |
| 29 | 35 | 0 | −28 | 1.509398 | 56.47 | Reflection | 41.343 |
| *30 | 36 | 17.73917 | 40 | 1.509398 | 56.47 | Reflection | 20.636 |
| *31 | 37 | −60 | 286 | | | Refraction | 37.407 |
| Image plane | S | 0 | | 0 | | Refraction | 1897.748 |

The decenter and bend factor β of the surface having the surface number of 29, that is, the first reflection surface 35 is −45. The lens data excluding the value of the axial inter-surface distance d in the field labeled with the surface number of 28 and the value of the axial inter-surface distance d in the field labeled with the surface number of 29 are the same as those in the projection system 3A according to Example 1. The data on the aspheric coefficients of each of the aspheric surfaces are also the same as those in the projection system 3A according to Example 1.

Effects and Advantages

The projection system 3B according to the present example includes the first optical system 31 and the second optical system 32 sequentially arranged from the reduction side toward the enlargement side. The second optical system projection system 3B according to the present example can have a short focal length as compared with the case where the second optical system 32 has only the second reflection surface 36.

The projection system 3B according to the present example, which includes the first reflection surface 35, readily directs the light flux that exits out of the second optical system 32 in a direction in which the light flux does not interfere with the first optical system 31.

Further, in the present example, in which the single optical element has the first reflection surface 35 and the second reflection surface 36, the second optical system 32 can be compact as compared with the case where the two reflection surfaces are provided to surfaces of separate optical elements. Moreover, the first reflection surface 35 and the second reflection surface 36 can be formed integrally with each other and can therefore be formed with high precision.

The first optical axis N1 of the first optical system 31 extends in the axis-X direction in the plane XZ, and the second optical axis N2 of the second optical system 32 extends in the axis-Z direction in the plane XZ. The projection system 3B is therefore compact in the axis-Y direction. Also in the axis-Z direction, in which the first reflection surface 35 deflects the optical path, the projection system 3B is compact in the axis-Z direction.

Further, in the present example, since the optical element 33 includes the convex second transmissive surface protruding toward the enlargement side, an increase in the size of the second reflection surface 36 disposed on the enlargement side of the intermediate image 40 can be suppressed. That is, in the second optical system 32, the second transmissive surface 37, which can refract the light flux, can suppress inclination of the intermediate image 40, which is conjugate with the enlargement-side image formation plane, with respect to the second optical axis N2 and the resultant increase in the size of the intermediate image 40. An increase in the size of the second reflection surface 36, which is located on the enlargement side of the intermediate image 40, can therefore be suppressed.

The intermediate image 40 is located between the first reflection surface 35 and the second reflection surface 36 of the optical element 33. The first optical system 31 and the optical element 33 are therefore allowed to approach each other as compared with the case where the intermediate image 40 is formed between the first optical system 31 and the optical element 33. The size of the projection system 3B can thus be reduced in the axis-Y direction.

Further, in the optical element 33, the first transmissive surface 34, which is located on the reduction side of the intermediate image 40, is an aspheric surface, whereby occurrence of aberrations at the intermediate image 40 can be suppressed. The second reflection surface 36 and the second transmissive surface 37 of the optical element 33 are each an aspheric surface. Occurrence of aberrations can therefore be suppressed in the enlargement-side image formation plane.

Further, in the optical element 33, the first transmissive surface 34 has a shape rotationally symmetric around the first optical axis N1. The second reflection surface 36 and the second transmissive surface 37 each have a shape rotationally symmetric around the second optical axis N2. The optical element 33 is therefore readily manufactured as compared with the case where the surfaces are not rotationally symmetric.

Further, in the present example, between the first optical system 31 and the second optical system 32, the distance between the chief rays therein decreases as they approach the second optical system 32. Therefore, the intermediate image 40 can be readily formed, and the size of the intermediate image 40 can be reduced. The size of the second reflection surface 36, which is located on the enlargement side of the intermediate image 40, is therefore readily reduced.

Figure 14:
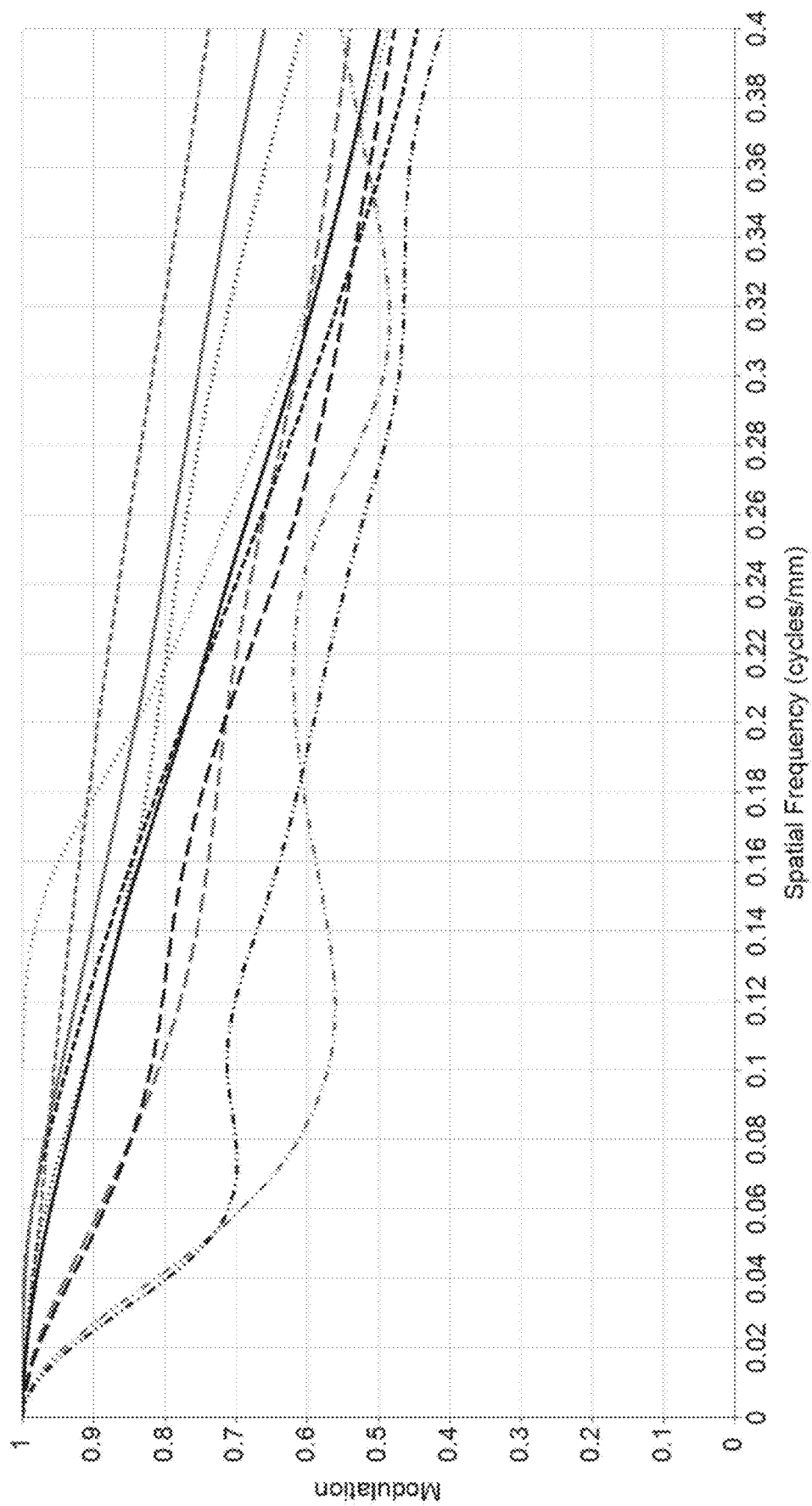
FIG. 14 shows the enlargement-side MTF of the projection system according to Example 2.
Figure 15:
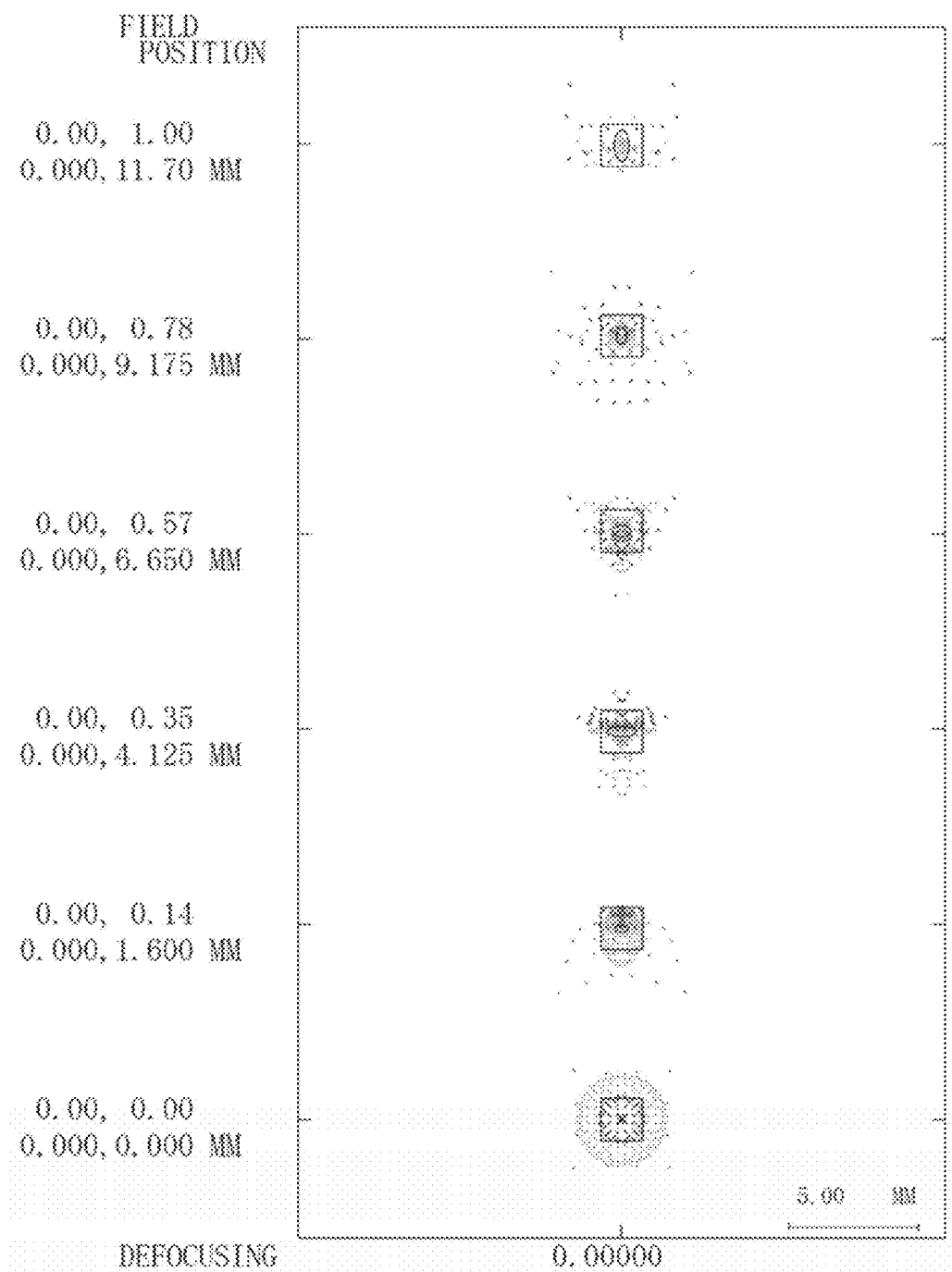
FIG. 15 is a spot diagram of a light spot produced by the projection system according to Example 2.

FIG. 14 shows the enlargement-side MTF of the projection system 3B. FIG. 15 is a spot diagram showing how well the light is collected on an image height position basis. The projection system 3B provides high resolution, as shown in FIGS. 14 and 15.

Example 3

Figure 16:
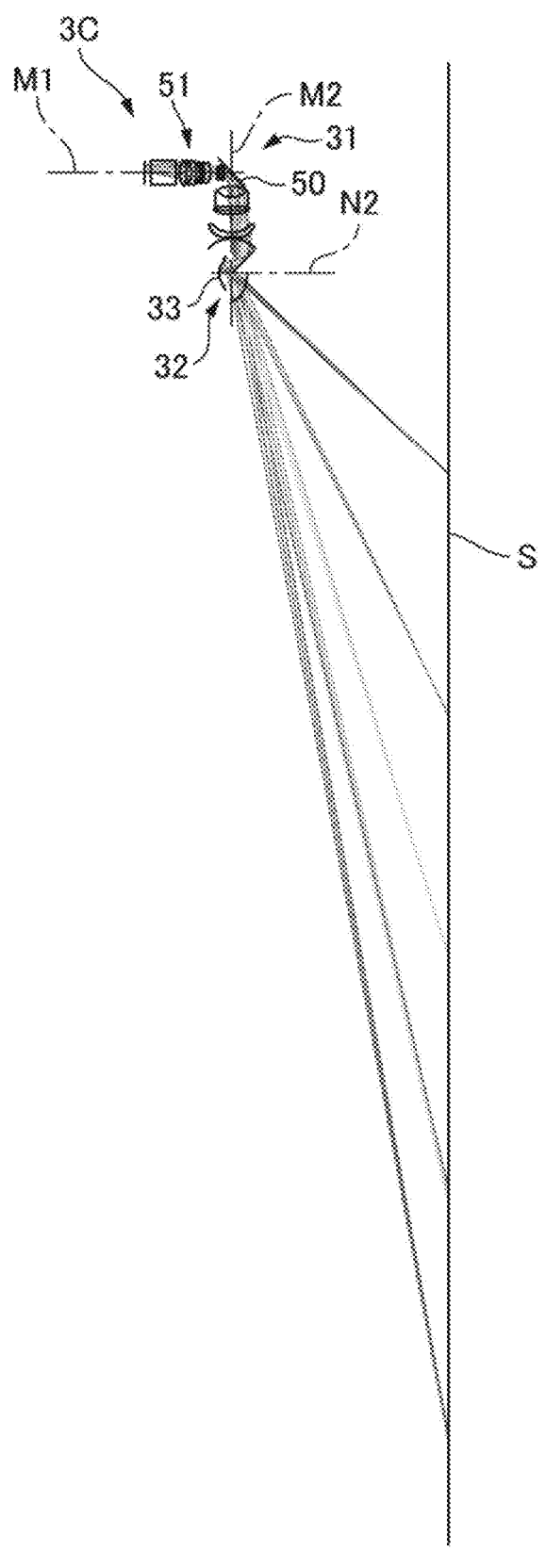
FIG. 16 is a light ray diagram diagrammatically showing the entire projection system according to Example 3.
Figure 17:
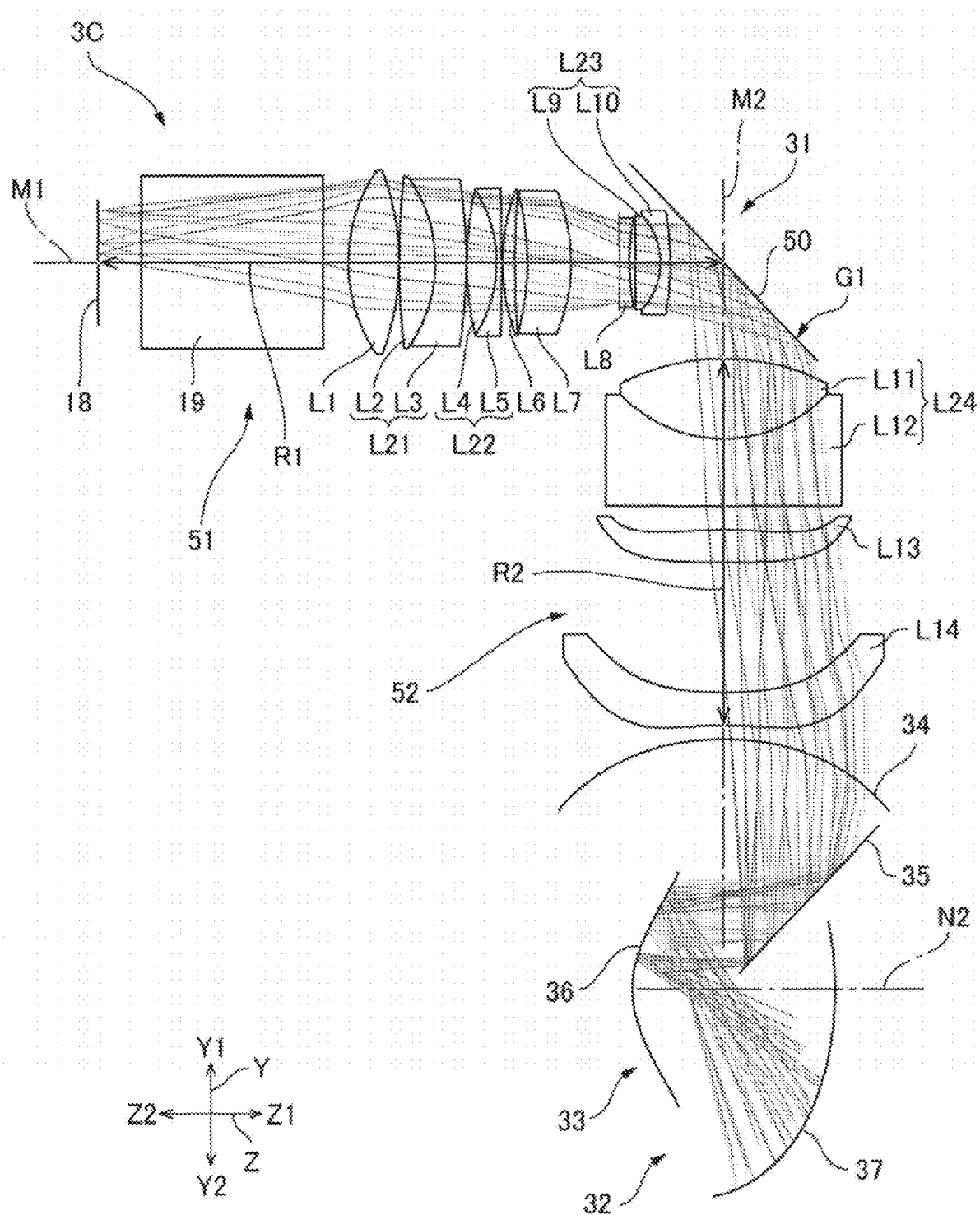
FIG. 17 is a light ray diagram of the projection system according to Example 3.
Figure 18:
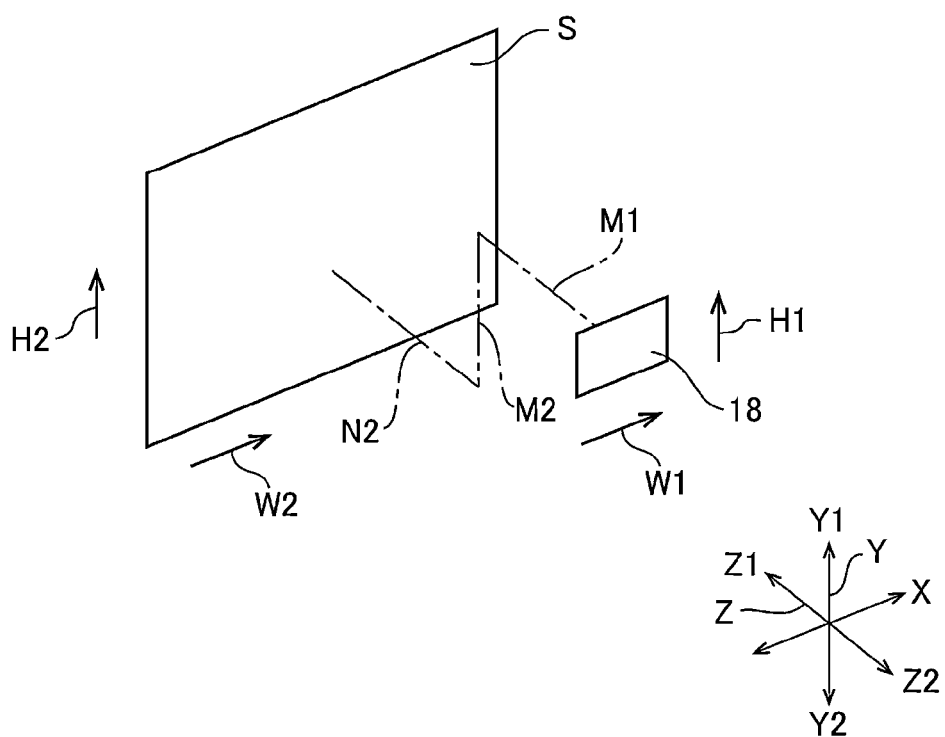
FIG. 18 is a descriptive diagram diagrammatically showing the optical axis of the projection system according to Example 3.

FIG. 16 is a light ray diagram diagrammatically showing the entirety of a projection system 3C according to Example 3. FIG. 17 is a light ray diagram of the projection system 3C according to Example 3. The projection system 3C is viewed in the axis-X direction, which is parallel to the screen S, in FIGS. 16 and 17. In FIGS. 16 and 17, the contour of the optical element 33, which forms the second optical system 32, is omitted. FIG. 18 is a descriptive diagram diagrammatically showing the optical axis of the projection system 3C from the reduction-side image formation plane to the enlargement-side image formation plane.

The projection system 3C according to the present example is so configured based on the projection system 3A according to Example 1 that a deflector 50, which deflects the first optical axis N1, is disposed in the middle of the first optical system 31. The lenses L1 to L14 and the optical element 33 of the second optical system 32 are the same as those in the projection system 3A.

The projection system 3C according to the present example includes the first optical system 31 and the second optical system 32 sequentially arranged from the reduction side toward the enlargement side, as shown in FIG. 16. The first optical system 31 is a refractive optical system including the plurality of lenses L1 to L14 and the deflector 50. The first optical system 31 includes the cross dichroic prism 19 and the 14 lenses L1 to L14, as shown in FIG. 17. The lenses L2 and L3 are bonded to each other into the first doublet L21. The lenses L4 and L5 are bonded to each other into the second doublet L22. The lenses L9 and L10 are bonded to each other into the third doublet L23. The lenses L11 and L12 are bonded to each other into the fourth doublet L24.

The deflector 50 is a flat mirror. The deflector 50 is disposed in a first air gap G1 having the largest axial inter-surface distance out of a plurality of air gaps provided between the lenses adjacent to each other in the first optical system 31, as shown in FIGS. 3, 16, and 17. The first air gap G1 is the gap between the lens L10 and the lens L11, that is, between the third double L23 and the fourth doublet L24. The deflector 50 is disposed in the first air gap G1 and deflects the first optical axis N1 of the first optical system 31. In the first optical system 31, a first section 51 located on the reduction side of the deflector 50 includes the lenses L1 to L10. In the first optical system 31, a second section 52 located on the enlargement side of the deflector 50 includes the lenses L11 to L14.

The thus disposed deflector 50 causes a first optical axis section M1, which is the optical axis of the first section 51, and a second optical axis section M2, which is the optical axis of the second section 52, to intersect each other. In the present example, the angle between the first optical axis section M1 and the second optical axis section M2 is 90°. In other words, the deflector 50 is so disposed as to incline by 45° with respect to the first optical axis N1 of the first optical system 31 before the deflector 50 is disposed. The first optical axis section M1 extends in the axis-Z direction, and the second optical axis section M2 extends in the axis-Y direction. The deflector 50 deflects the light flux that exits in the first direction Z1 out of the first section 51 by 90° toward the lower side Y2.

The first section 51 has positive power. The second section 52 has negative power. The first optical system 31 as a whole has positive power. Therefore, between the first optical system 31 and the second optical system 32, the distance between the chief rays therein decreases as they approach the second optical system 32.

The optical element 33 has the first transmissive surface 34, the first reflection surface 35, the second reflection surface 36, and the second transmissive surface 37 sequentially arranged from the reduction side toward the enlargement side. The first transmissive surface 34 has a convex shape protruding toward the reduction side. The first reflection surface 35 is a flat surface. The second reflection surface 36 has a concave shape. The second transmissive surface 37 has a convex shape protruding toward the enlargement side.

the final image extends in the axis-X direction. The widthwise direction of the screen S, that is, the height direction H2 of the final image extends in the axis-Y direction.

Lens Data

Data on the lenses of the projection system 3C are listed below.

| Surface number | Name | r | d | nd | vd | Mode | Y |
|---|---|---|---|---|---|---|---|
| Object plane | 18 | 0 | 8.5 | | | Refraction | |
| 1 | 19 | 0 | 35.95 | 1.51633 | 64.14 | Refraction | 12.573 |
| 2 | | 0 | 5 | | | Refraction | 14.999 |
| 3 | L01 | 29.33178 | 10.078656 | 1.442044 | 86.63 | Refraction | 16 |
| 4 | | −46.7571 | 0.1 | | | Refraction | 15.852 |
| 5 | L02 | 148.79233 | 7.071831 | 1.772054 | 47.71 | Refraction | 14.902 |
| 6 | L03 | −26.54503 | 6.108227 | 2.0196 | 20.783 | Refraction | 14.521 |
| 7 | | −95.30317 | 0.1 | | | Refraction | 13.827 |
| 8 | L04 | 57.12601 | 5.870101 | 1.494958 | 52.92 | Refraction | 12.989 |
| 9 | L05 | −24.31043 | 1 | 2.0508 | 26.942 | Refraction | 12.77 |
| 10 | | −887.31514 | 0.2 | | | Refraction | 12.691 |
| 11 | L06 | 37.22942 | 2.436591 | 1.986125 | 16.48 | Refraction | 12.565 |
| 12 | | 155.01669 | 2.483493 | | | Refraction | 12.414 |
| 13 | L07 | −45.82387 | 8.6095 | 1.526239 | 38.78 | Refraction | 12.314 |
| 14 | | −32.53128 | 9.5 | | | Refraction | 11.559 |
| Aperture plane | | 0 | 0.1 | | | Refraction | 7.5 |
| 16 | L08 | −323.72495 | 2 | 2.0508 | 26.942 | Refraction | 7.5 |
| 17 | | 42.89214 | 1.15812 | | | Refraction | 7.578 |
| 18 | L09 | 1757.31503 | 4.943349 | 1.840029 | 18.61 | Refraction | 7.709 |
| 19 | L10 | −12.35292 | 2 | 2.0508 | 26.942 | Refraction | 7.982 |
| 20 | | −48.32828 | 28.476179 | | | Refraction | 8.812 |
| 21 | 51 | 0 | −18 | | | Reflection | 24.52 |
| 22 | Lil | −45.45967 | −15 | 1.686174 | 23.14 | Refraction | 19 |
| 23 | L12 | 29.191 | −12.671948 | 1.990031 | 16.9 | Refraction | 19.076 |
| 24 | | 3485.13836 | −4.481986 | | | Refraction | 21.906 |
| *25 | L13 | −105.64407 | −6 | 1.531131 | 55.75 | Refraction | 22.487 |
| *26 | | 519.77235 | −24.526951 | | | Refraction | 23.721 |
| *27 | L14 | 78.70625 | −6 | 1.531131 | 55.75 | Refraction | 27.151 |
| *28 | | −66.20602 | −2.620232 | | | Refraction | 30.053 |
| *29 | 34 | −57.65154 | −47 | 1.509398 | 56.47 | Refraction | 30.974 |
| 30 | 35 | 0 | 18 | 1.509398 | 56.47 | Reflection | 41.343 |
| *31 | 36 | −17.73917 | −40 | 1.509398 | 56.47 | Reflection | 20.636 |
| *32 | | 60 | −286 | | | Refraction | 37.407 |
| Image plane | S | 0 | 0 | | | Refraction | 1897.748 |

The light flux having exited out of the first optical system 31 toward the lower side Y2 is incident on the first transmissive surface 34. The first reflection surface 35 deflects by 90° the light flux passing through the first transmissive surface in the second direction Z2, which is the direction away from the screen S. The light flux reflected off the first reflection surface 35 is reflected off the second reflection surface 36 in the first direction Z1 toward the lower side Y2. The light flux reflected off the second reflection surface 36 and passing through the second transmissive surface 37 exits out of the optical element 33 toward the lower side Y2 and reaches the screen S.

In the projection system 3C, the reduction-side image formation plane and the enlargement-side image formation plane are parallel to each other, as shown in FIG. 18. That is, the reduction-side image formation plane, where the liquid crystal panels 18 form the projection images, extends along the plane XY. The lengthwise direction of the liquid crystal panels 18, that is, the width direction W1 of the projection images extends in the axis-X direction. The widthwise direction of the liquid crystal panels 18, that is, the height direction H1 of the projection images extends in the axis-Y direction. The screen S, on which the final image is formed, extends along the plane XY. The lengthwise direction of the screen S, that is, the width direction W2 of The surface having the surface number of 21 is the reflection surface of the deflector 50. The decenter and bend factor α of the surface having the surface number 21 is 45. The decenter and bend factor α of the surface having the surface number of 30, that is, the first reflection surface 35 is 45. The aspheric coefficients of each of the aspheric surfaces are the same as those in Example 1. That is, the aspheric coefficients of the surfaces having the surface numbers of 25 to 29, 31, and 32 are equal to those of the surfaces having the surface numbers of 24 to 28, 30, and 31 in Example 1.

A first length R1, which is the overall length of the first section 51, is longer than a second length R2, which is the overall length of the second section 52, as indicated by the lens data. That is, the first length R1 from the liquid crystal panels 18, which are located in the reduction-side image formation plane, to the enlargement-side surface of the lens L10 is longer than the second length R2 from the reduction-side surface of the lens L11 to the enlargement-side surface of the lens L14, as shown in FIG. 17. In other words, the second length R2, which is the overall length of the second section 52, is shorter than the first length R1, which is the overall length of the first section 51. The first length R1 is 113.21 mm, and the second length R2 is 68.6809 mm.

Effects and Advantages

The projection system 3C according to the present example can provide the same effects and advantages as those provided by the projection system 3A according to Example 1.

In the present example, the deflector 50, which deflects the first optical axis N1 of the first optical system 31, which extends in the axis-Z direction, toward the lower side Y2 is provided. The first optical system 31 thus includes the second section 52, which extends in the axis-Y direction, and the first section 51, which extends in the axis-Z direction. Therefore, the size of the projection system 3C according to the present example increases in the axis-Z direction but can be reduced in the axis-Y direction as compared with the projection system 3A according to Example 1.

Further, in the present example, the deflector 50 is disposed in the first optical system 31 in the first air gap G1 having the largest axial inter-surface distance along the first optical axis N1. The deflector 50 is therefore readily disposed. Further, an increase in the size of the first optical system 31 can be suppressed even when the deflector 50 is disposed.

In the first optical system 31 in the present example, the second length R2, which is the overall length of the second section 52, is shorter than the first length R1, which is the overall length of the first section 51. Therefore, when the optical element 33 is disposed on an extension of the second optical axis section M2 of the second section 52, an increase in the size of the projection system. 3C in the axis-Y direction can be suppressed as compared with a case where the second length R2 is greater than the first length R1.

Figure 19:
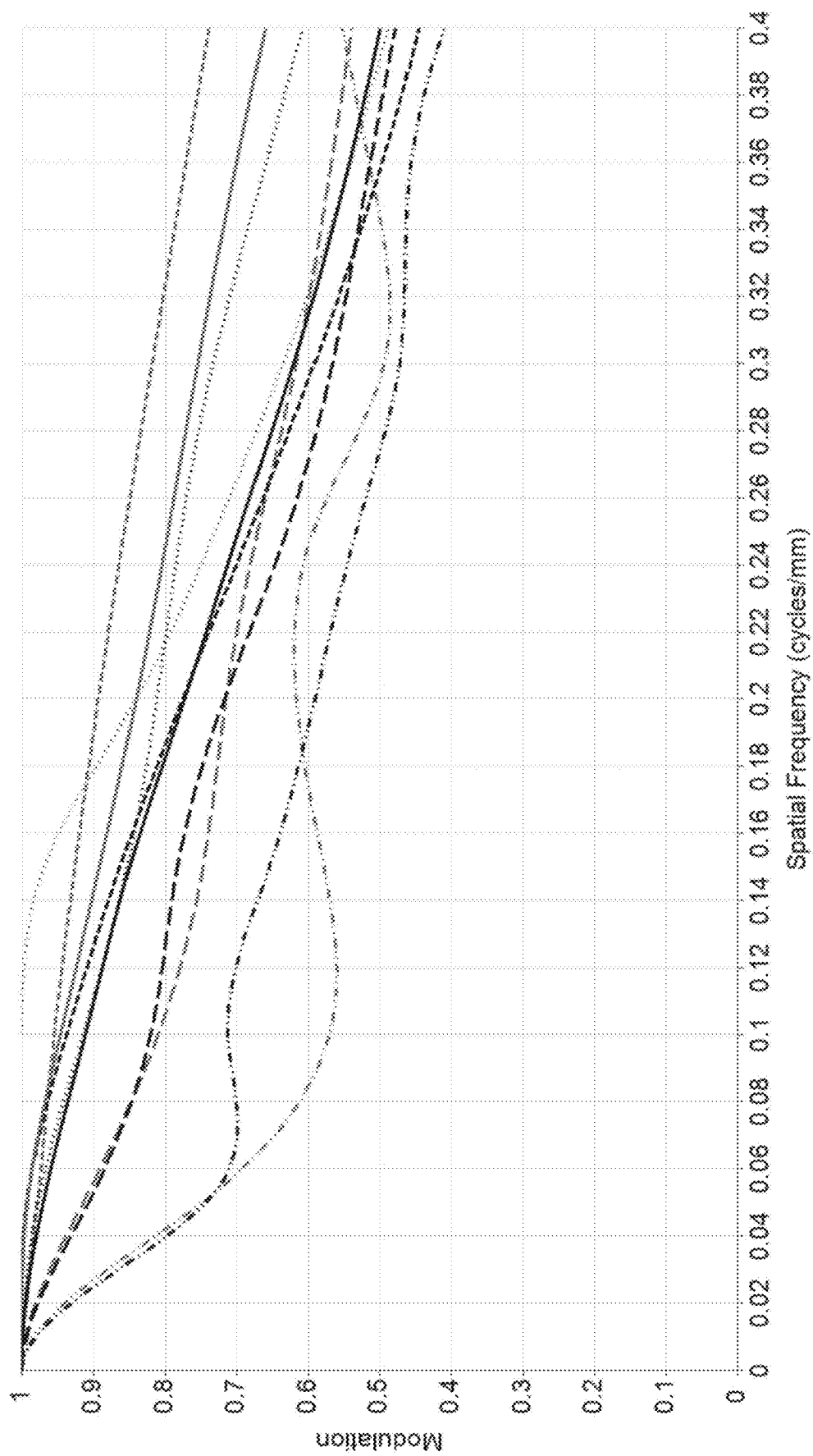
FIG. 19 shows the enlargement-side MTF of the projection system according to Example 3.
Figure 20:
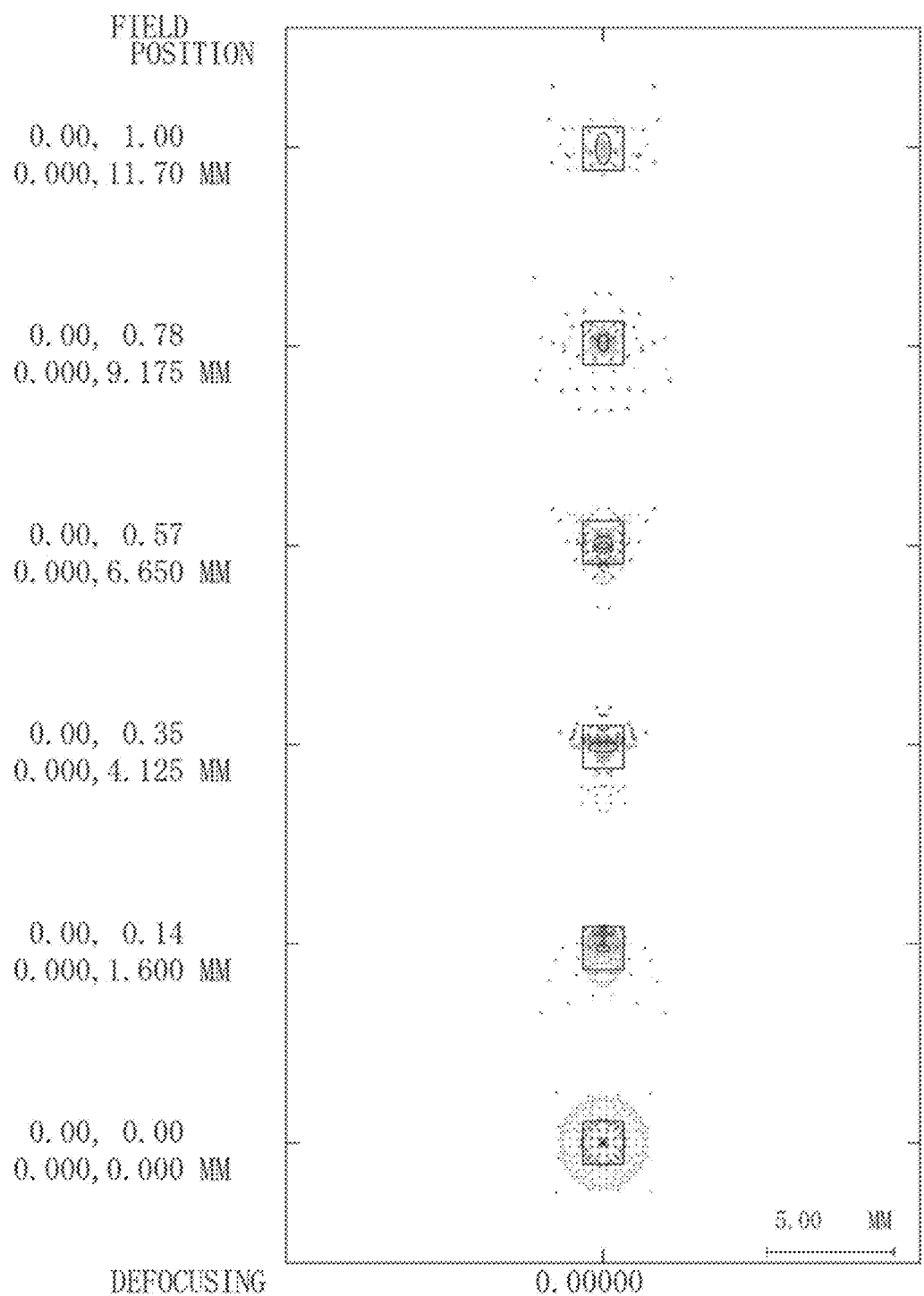
FIG. 20 is a spot diagram of a light spot produced by the projection system according to Example 3.

FIG. 19 shows the enlargement-side MTF of the projection system 3C. FIG. 20 is a spot diagram showing how well the light is collected on an image height position basis. The projection system 3C provides high resolution, as shown in FIGS. 19 and 20.

Example 4

Figure 21:
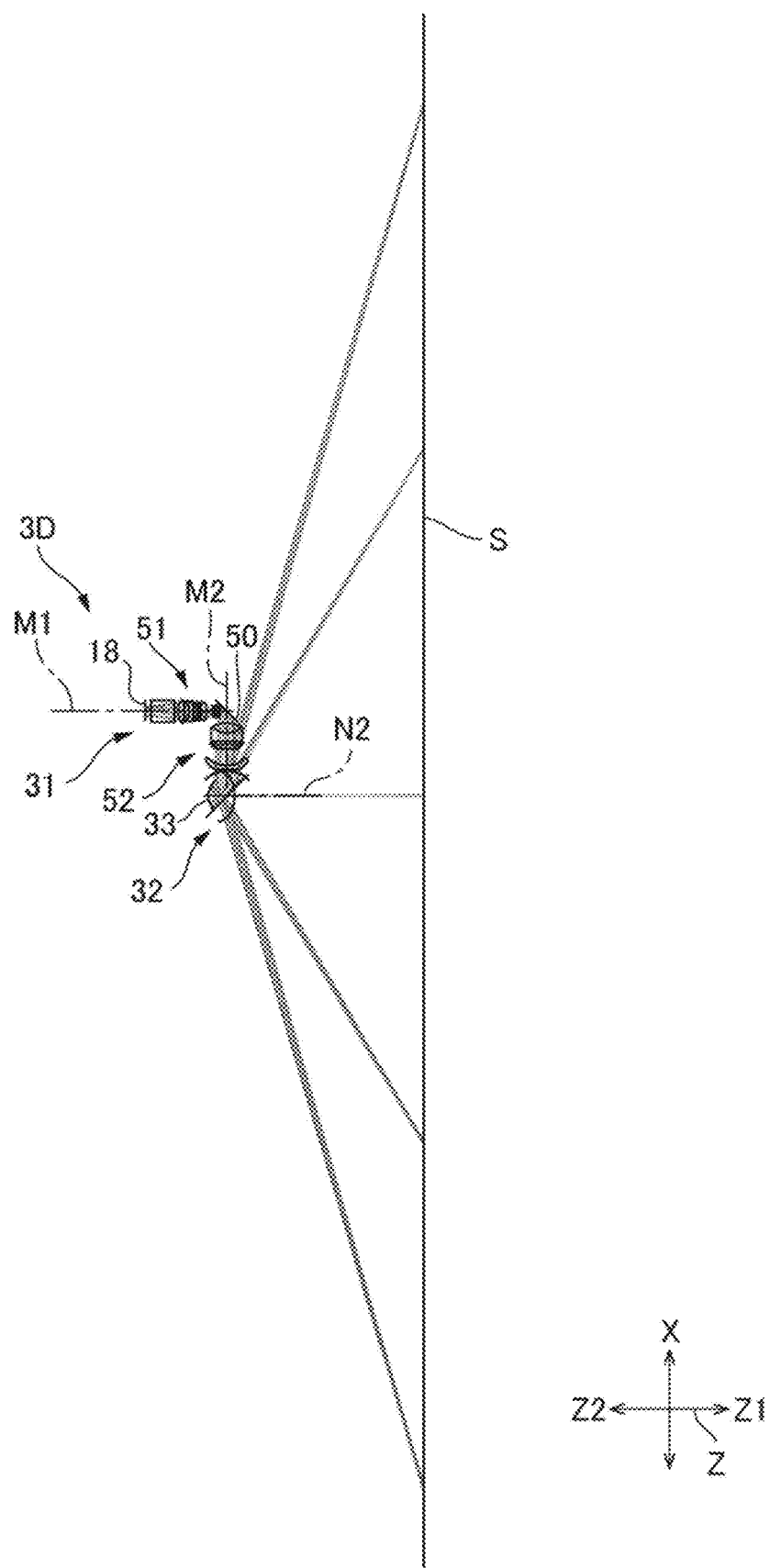
FIG. 21 is a light ray diagram diagrammatically showing the entire projection system according to Example 4.
Figure 22:
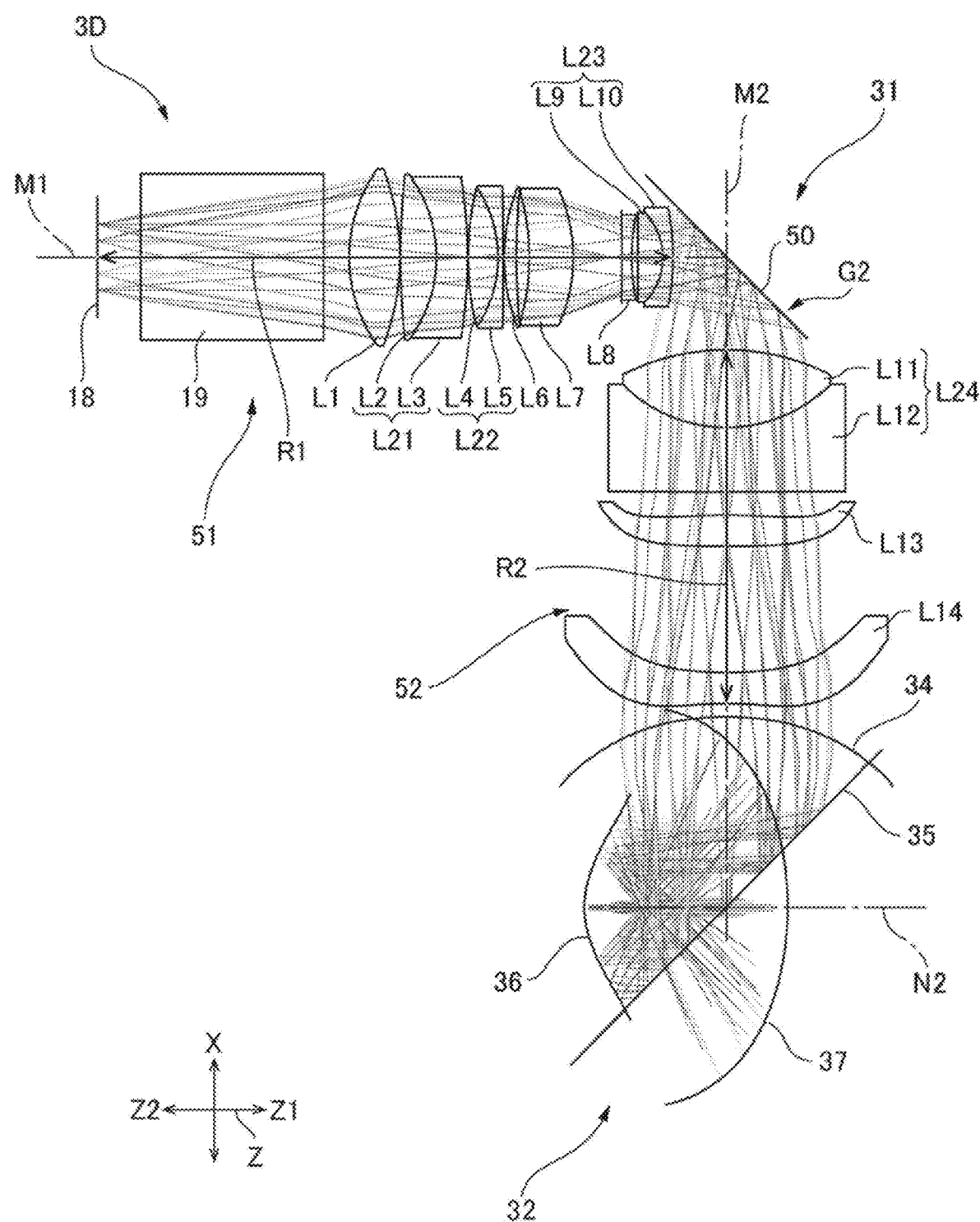
FIG. 22 is a light ray diagram of the projection system according to Example 4.
Figure 23:
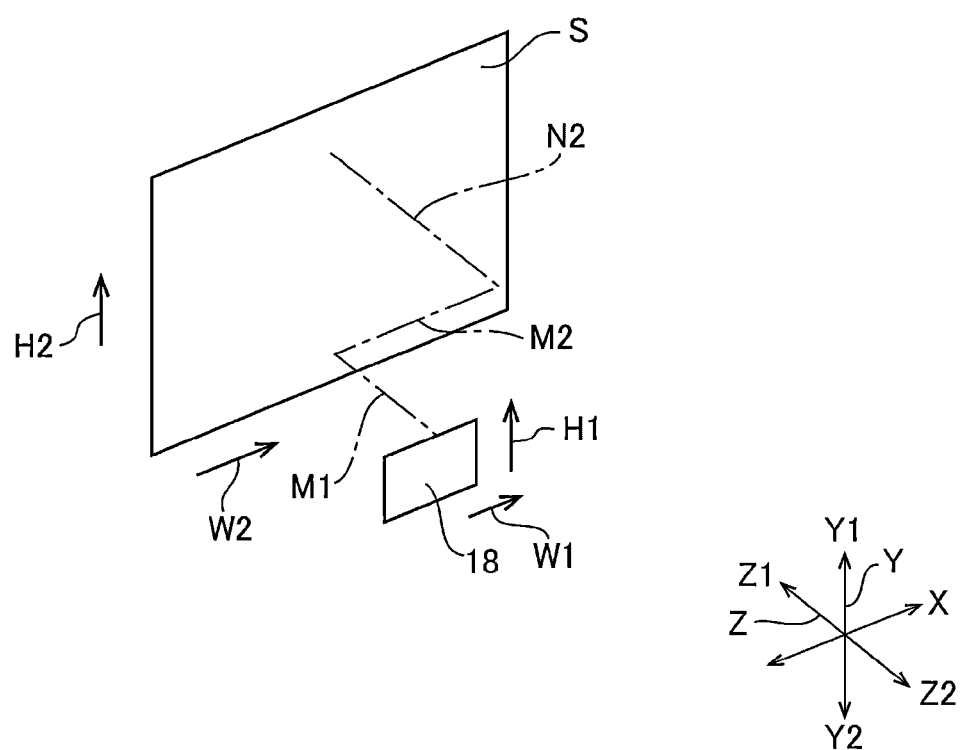
FIG. 23 is a descriptive diagram diagrammatically showing the optical axis of the projection system according to Example 4.

FIG. 21 is a light ray diagram diagrammatically showing the entirety of a projection system 3D according to Example 4. FIG. 22 is a light ray diagram of the projection system 3D according to Example 4. In FIGS. 21 and 22, the projection system 3D is viewed from the upper side Y1. In FIGS. 21 and 22, the contour of the optical element 33, which forms the second optical system 32, is omitted. FIG. 23 is a descriptive diagram diagrammatically showing the optical axis of the projection system 3D from the reduction-side image formation plane to the enlargement-side image formation plane.

The projection system 3D according to the present example is so configured based on the projection system 3B according to Example 2 that the deflector 50, which deflects the first optical axis N1, is disposed in the middle of the first optical system 31. The lenses L1 to L14 and the optical element 33 of the second optical system 32 are the same as those in the projection system 3B.

The projection system 3D according to the present example includes the first optical system 31 and the second optical system 32 sequentially arranged from the reduction side toward the enlargement side, as shown in FIG. 21. The first optical system 31 is a refractive optical system including the plurality of lenses L1 to L14 and the deflector 50. The first optical system 31 includes the cross dichroic prism 19 and the 14 lenses L1 to L14, as shown in FIG. 22. The lenses L2 and L3 are bonded to each other into the first doublet L21. The lenses L4 and L5 are bonded to each other into the second doublet L22. The lenses L9 and L10 are bonded to each other into the third doublet L23. The lenses L11 and L12 are bonded to each other into the fourth doublet L24.

The deflector 50 is a flat mirror. The deflector 50 is disposed in a first air gap G2 having the largest axial inter-surface distance out of a plurality of air gaps provided between the lenses adjacent to each other in the first optical system 31, as shown in FIGS. 10, 11, and 22. The first air gap G2 is the gap between the lens L10 and the lens L11, that is, between the third double L23 and the fourth doublet L24. The deflector 50 is disposed in the first air gap G2 and deflects the first optical axis N1 of the first optical system 31. In the first optical system 31, the first section 51 located on the reduction side of the deflector 50 includes the lenses L1 to L10. In the first optical system 31, the second section 52 located on the enlargement side of the deflector 50 includes the lenses L11 to L14.

The thus disposed deflector 50 causes the first optical axis section M1, which is the optical axis of the first section 51, and the second optical axis section M2, which is the optical axis of the second section 52, to intersect each other. In the present example, the angle between the first optical axis section M1 and the second optical axis section M2 is 90°. In other words, the deflector 50 is so disposed as to incline by 45° with respect to the first optical axis N1 of the first optical system 31 before the deflector 50 is disposed. The first optical axis section M1 extends in the axis-Z direction in the plane XZ, and the second optical axis section M2 extends in the axis-X direction in the plane XZ. The deflector 50 deflects the light flux that exits in the first direction Z1 out of the first section 51 by 90° in the axis-X direction, which is parallel to the screen S.

The first section 51 has positive power. The second section 52 has negative power. The first optical system 31 as a whole has positive power. Therefore, between the first optical system 31 and the second optical system 32, the distance between the chief rays therein decreases as they approach the second optical system 32.

The optical element 33 has the first transmissive surface 34, the first reflection surface 35, the second reflection surface 36, and the second transmissive surface 37 sequentially arranged from the reduction side toward the enlargement side. The first transmissive surface 34 has a convex shape protruding toward the reduction side. The first reflection surface 35 is a flat surface. The second reflection surface 36 has a concave shape. The second transmissive surface 37 has a convex shape protruding toward the enlargement side.

The light flux having exited out of the first optical system 31 in the axis-X direction is incident on the first transmissive surface 34. The first reflection surface 35 deflects the light flux having passed through the first transmissive surface 34 by 90° in the second direction Z2, which is the direction away from the screen S. The light flux reflected off the first reflection surface 35 is reflected off the second reflection surface 36 in the first direction Z1 toward the upper side Y1. The light flux reflected off the second reflection surface 36 and passing through the second transmissive surface 37 exits out of the optical element 33 in the first direction Z1 toward the upper side Y1 and reaches the screen S.

In the projection system 3D, the reduction-side image formation plane and the enlargement-side image formation plane are parallel to each other, as shown in FIG. 23. That is, the reduction-side image formation plane, where the liquid crystal panels 18 form the projection images, extends along the plane XY. The lengthwise direction of the liquid crystal panels 18, that is, the width direction W1 of the projection images extends in the axis-X direction. The widthwise direction of the liquid crystal panels 18, that is, the height direction H1 of the projection images extends in the axis-Y direction. The screen S, on which the final image is formed, extends along the plane XY. The lengthwise direction of the screen S, that is, the width direction W2 of the final image extends in the axis-X direction. The widthwise direction of the screen S, that is, the height direction H2 of the final image extends in the axis-Y direction.

Lens Data

Data on the lenses of the projection system 3D are listed below.

| Surface number | Name | r | d | nd | vd | Mode | Y |
|---|---|---|---|---|---|---|---|
| Object plane | 18 | 0 | 8.5 | | | Refraction | |
| 1 | 19 | 0 | 35.95 | 1.51633 | 64.14 | Refraction | 12.573 |
| 2 | | 0 | 5 | | | Refraction | 14.999 |
| 3 | L01 | 29.33178 | 10.078656 | 1.442044 | 86.63 | Refraction | 16 |
| 4 | | −46.7571 | 0.1 | | | Refraction | 15.852 |
| 5 | L02 | 148.79233 | 7.071831 | 1.772054 | 47.71 | Refraction | 14.902 |
| 6 | L03 | −26.54503 | 6.108227 | 2.0196 | 20.783 | Refraction | 14.521 |
| 7 | | −95.30317 | 0.1 | | | Refraction | 13.827 |
| 8 | L04 | 57.12601 | 5.870101 | 1.494958 | 52.92 | Refraction | 12.989 |
| 9 | L05 | −24.31043 | 1 | 2.0508 | 26.942 | Refraction | 12.77 |
| 10 | | −887.31514 | 0.2 | | | Refraction | 12.691 |
| 11 | L06 | 37.22942 | 2.436591 | 1.986125 | 16.48 | Refraction | 12.565 |
| 12 | | 155.01669 | 2.483493 | | | Refraction | 12.414 |
| 13 | L07 | −45.82387 | 8.6095 | 1.526239 | 38.78 | Refraction | 12.314 |
| 14 | | −32.53128 | 9.5 | | | Refraction | 11.559 |
| Aperture plane | | 0 | 0.1 | | | Refraction | 7.5 |
| 16 | L08 | −323.72495 | 2 | 2.0508 | 26.942 | Refraction | 7.5 |
| 17 | | 42.89214 | 1.15812 | | | Refraction | 7.578 |
| 18 | L09 | 1757.31503 | 4.943349 | 1.840029 | 18.61 | Refraction | 7.709 |
| 19 | L10 | −12.35292 | 2 | 2.0508 | 26.942 | Refraction | 7.982 |
| 20 | | −48.32828 | 28.476179 | | | Refraction | 8.812 |
| 21 | 51 | 0 | −18 | | | Reflection | 21.055 |
| 22 | L11 | −45.45967 | −15 | 1.686174 | 23.14 | Refraction | 19 |
| 23 | L12 | 29.191 | −12.671948 | 1.990031 | 16.9 | Refraction | 19.076 |
| 24 | | 3485.13836 | −4.481986 | | | Refraction | 21.906 |
| *25 | L13 | −105.64407 | −6 | 1.531131 | 55.75 | Refraction | 22.487 |
| *26 | | 519.77235 | −24.526951 | | | Refraction | 23.721 |
| *27 | L14 | 78.70625 | −6 | 1.531131 | 55.75 | Refraction | 27.151 |
| *28 | | −66.20602 | −2.620232 | | | Refraction | 30.053 |
| *29 | 34 | −57.65154 | −37 | 1.509398 | 56.47 | Refraction | 30.974 |
| 30 | 35 | 0 | 28 | 1.509398 | 56.47 | Reflection | 41.343 |
| *31 | 36 | −17.73917 | −40 | 1.509398 | 56.47 | Reflection | 20.636 |
| *32 | 37 | 60 | −286 | | | Refraction | 37.407 |
| Image plane | S | 0 | 0 | | | Refraction | 1897.748 |

The surface having the surface number of 21 is the reflection surface of the deflector 50. The decenter and bend factor β of the surface having the surface number of 21 is −45. The decenter and bend factor α of the surface having the surface number of 30, that is, the first reflection surface 35 is 45. The aspheric coefficients of each of the aspheric surfaces are the same as those in Example 1. That is, the aspheric coefficients of the surfaces having the surface numbers of 25 to 29, 31, and 32 are equal to those of the surfaces having the surface numbers of 24 to 28, 30, and 31 in Example 1.

The first length R1, which is the overall length of the first section 51, is longer than the second length R2, which is the overall length of the second section 52, as indicated by the lens data. In other words, the second length R2, which is the overall length of the second section 52, is shorter than the first length R1, which is the overall length of the first section 51. The first length R1 and the second length R2 are equal to those in Example 3.

Effects and Advantages

The projection system 3D according to present example can provide the same effects and advantages as those provided by the projection system 3B according to Example 2.

In the present example, the deflector 50, which deflects the first optical axis N1 of the first optical system 31, which extends in the axis-Z direction, in the axis-X direction, is disposed. The first optical system 31 thus includes the second section 52, which extends in the axis-X direction, and the first section 51, which extends in the axis-Z direction. Therefore, the size of the projection system 3D according to the present example increases in the axis-Z direction but can be reduced in the axis-X direction as compared with the projection system 3B according to Example 2.

Further, in the present example, the deflector 50 is disposed in the first optical system 31 in the first air gap G2 having the largest axial inter-surface distance along the first optical axis N1. The deflector 50 is therefore readily disposed. Further, an increase in the size of the first optical system 31 can be suppressed even when the deflector 50 is disposed.

In the present example, as for the first optical system 31, the second length R2, which is the overall length of the second section 52, is shorter than the first length R1, which is the overall length of the first section 51. Therefore, when the optical element 33 is disposed on an extension of the second optical axis section M2 of the second section 52, an increase in the size of the projection system 3D in the axis-X direction can be suppressed as compared with the case where the second length R2 is greater than the first length R1.

Figure 24:
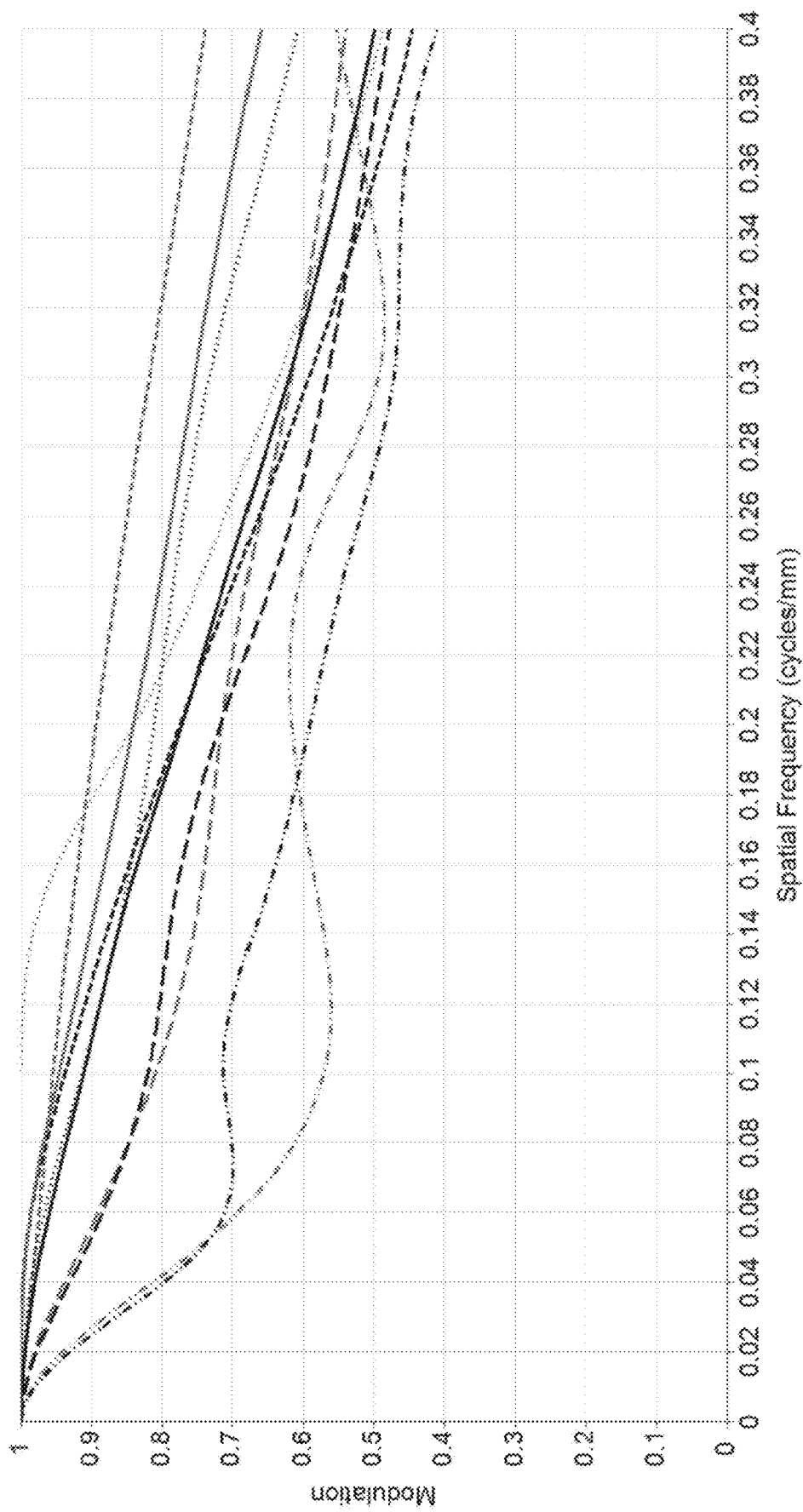
FIG. 24 shows the enlargement-side MTF of the projection system according to Example 4.
Figure 25:
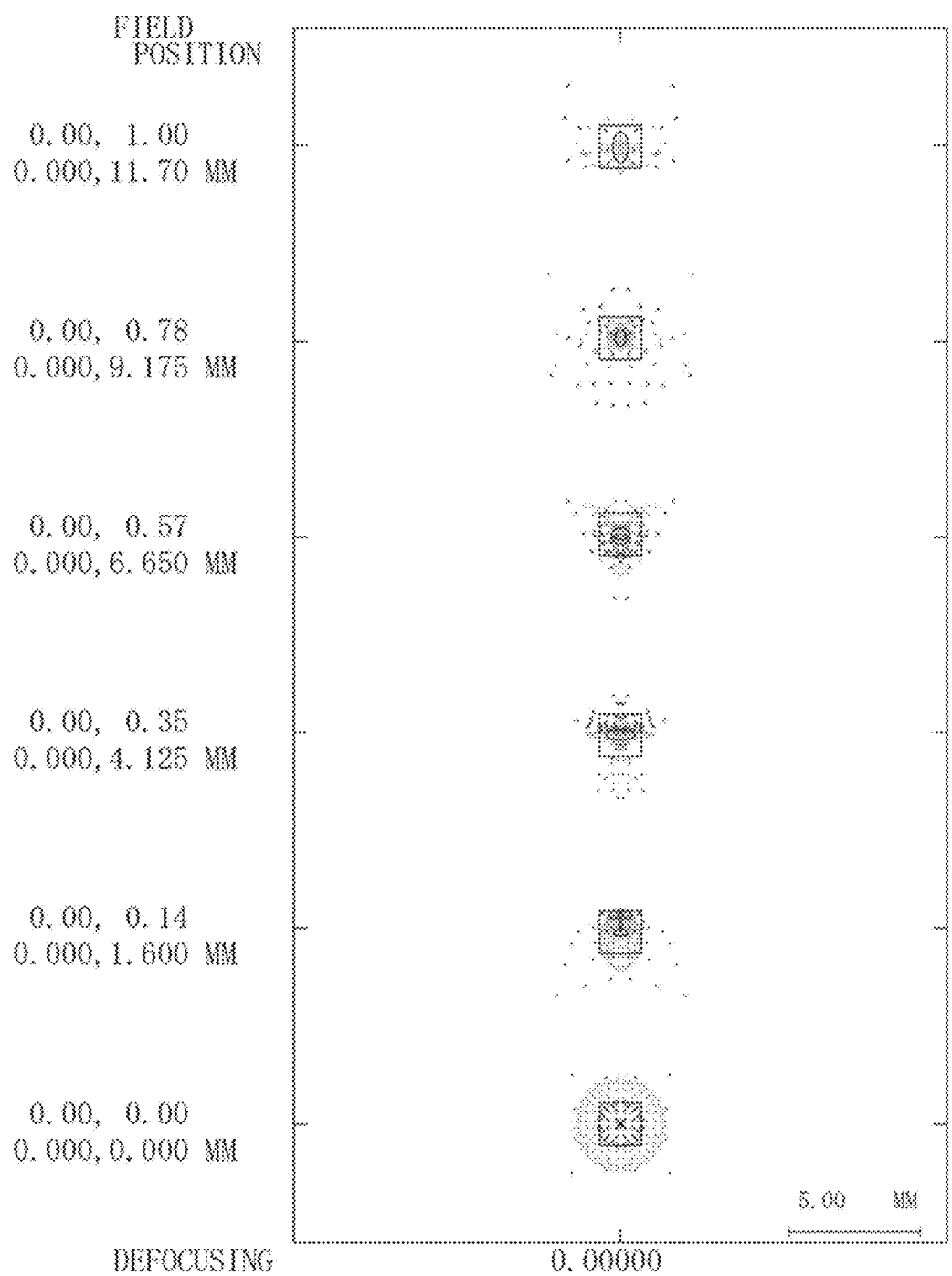
FIG. 25 is a spot diagram of a light spot produced by the projection system according to Example 4.

FIG. 24 shows the enlargement-side MTF of the projection system 3D. FIG. 25 is a spot diagram showing how well the light is collected on an image height position basis. The projection system 3D provides high resolution, as shown in FIGS. 24 and 25.

Example 5

Figure 26:
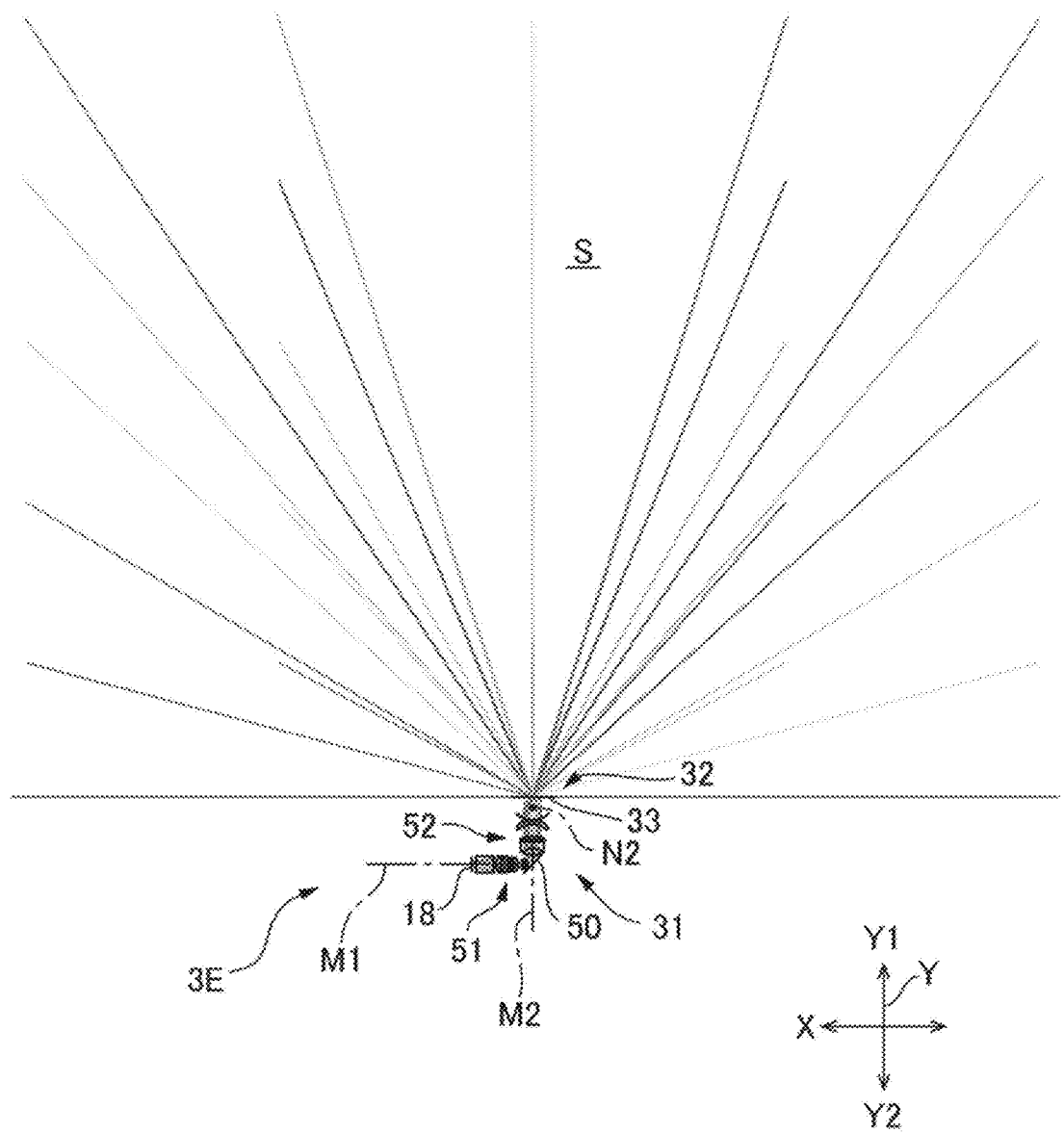
FIG. 26 is a light ray diagram diagrammatically showing the entire projection system according to Example 5.
Figure 27:
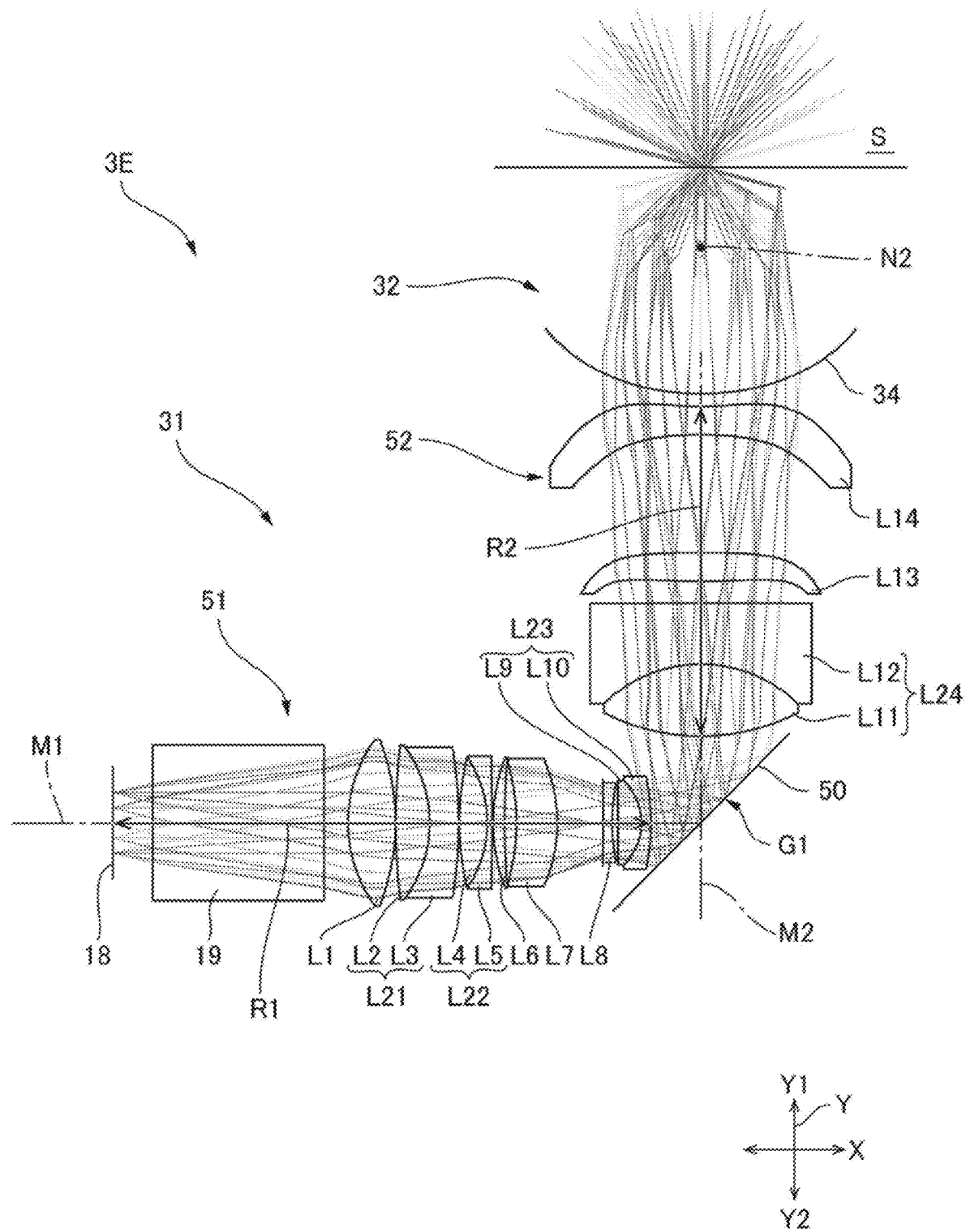
FIG. 27 is a light ray diagram of the projection system according to Example 5.
Figure 28:
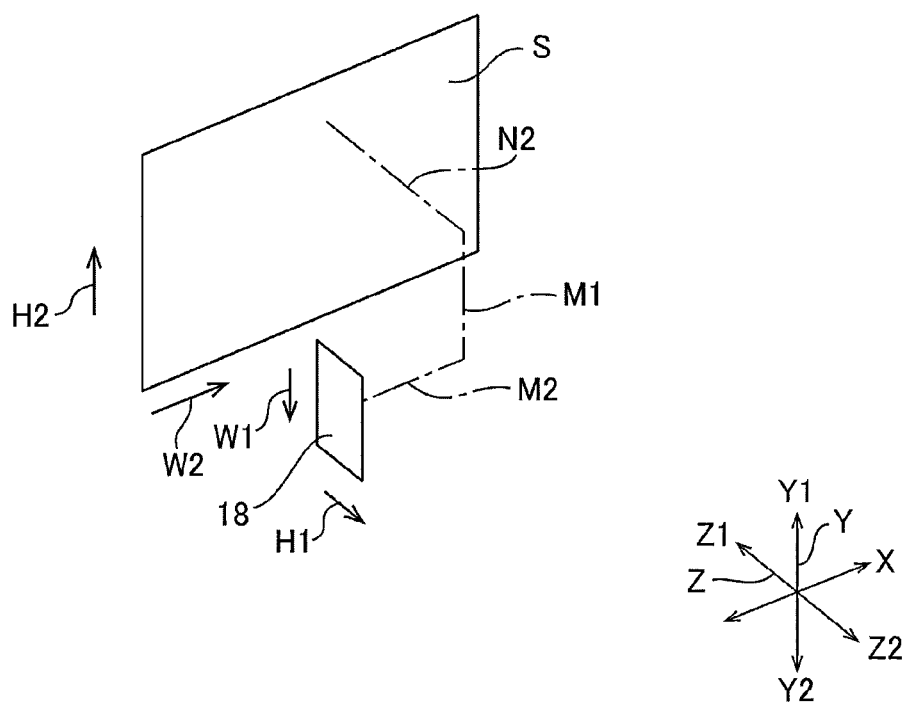
FIG. 28 is a descriptive diagram diagrammatically showing the optical axis of the projection system according to Example 5.

FIG. 26 is a light ray diagram diagrammatically showing the entirety of a projection system 3E according to Example 5. FIG. 27 is a light ray diagram of the projection system 3E according to Example 5. In FIGS. 26 and 27, the projection system 3E is viewed in the axis-Z direction, which is perpendicular to the screen S. In FIGS. 26 and 27, the contour of the optical element 33, which forms the second optical system 32, is omitted. FIG. 28 is a descriptive diagram diagrammatically showing the optical axis of the projection system 3E from the reduction-side image formation plane to the enlargement-side image formation plane.

The projection system 3E according to the present example is so configured based on the projection system 3A according to Example 1 that the deflector 50, which deflects the first optical axis N1, is disposed in the middle of the first optical system 31. The projection system 3E according to the present example is further so configured that the deflector 50 deflects the first optical axis N1 in a direction different from the direction in the projection system 3C according to Example 3. The lenses L1 to L14 and the optical element 33 of the second optical system 32 are the same as those in the projection system 3A.

The projection system 3E according to the present example includes the first optical system 31 and the second optical system 32 sequentially arranged from the reduction side toward the enlargement side, as shown in FIG. 26. The first optical system 31 is a refractive optical system including the plurality of lenses L1 to L14 and the deflector 50. The first optical system 31 includes the cross dichroic prism 19 and the 14 lenses L1 to L14, as shown in FIG. 27. The lenses L2 and L3 are bonded to each other into the first doublet L21. The lenses L4 and L5 are bonded to each other into the second doublet L22. The lenses L9 and L10 are bonded to each other into the third doublet L23. The lenses L11 and L12 are bonded to each other into the fourth doublet L24.

The deflector 50 is a flat mirror. The deflector 50 is disposed in the first air gap G1 having the largest axial inter-surface distance out of a plurality of air gaps provided between the lenses adjacent to each other in the first optical system 31, as shown in FIG. 27. The first air gap G1 is the gap between the lens L10 and the lens L11, that is, between the third double L23 and the fourth doublet L24. The deflector 50 is disposed in the first air gap G1 and deflects the first optical axis N1 of the first optical system 31. In the first optical system 31, the first section 51 located on the reduction side of the deflector 50 includes the lenses L1 to L10. In the first optical system 31, the second section 52 located on the enlargement side of the deflector 50 includes the lenses L11 to L14.

The thus disposed deflector 50 causes the first optical axis section M1, which is the optical axis of the first section 51, and the second optical axis section M2, which is the optical axis of the second section 52, to intersect each other. In the present example, the angle between the first optical axis section M1 and the second optical axis section M2 is 90°. The first optical axis section M1 extends in the axis-X direction, and the second optical axis section M2 extends in the axis-Y direction. The deflector 50 deflects the light flux that exits out of the first section 51 in the axis-X direction toward the upper side Y1 by 90°.

The first section 51 has positive power. The second section 52 has negative power. The first optical system 31 as a whole has positive power. Therefore, between the first optical system 31 and the second optical system 32, the distance between the chief rays therein decreases as they approach the second optical system 32.

The optical element 33 has the first transmissive surface 34, the first reflection surface 35, the second reflection surface 36, and the second transmissive surface 37 sequentially arranged from the reduction side toward the enlargement side. The first transmissive surface 34 has a convex shape protruding toward the reduction side. The first reflection surface 35 is a flat surface. The second reflection surface 36 has a concave shape. The second transmissive surface 37 has a convex shape protruding toward the enlargement side.

The light flux having exited out of the first optical system 31 toward the upper side Y1 is incident on the first transmissive surface 34. The first reflection surface 35 deflects the light flux having passed through the first transmissive surface 34 by 90° in the second direction Z2, which is the direction away from the screen S. The light flux reflected off the first reflection surface 35 is reflected off the second reflection surface 36 in the first direction Z1 toward the upper side Y1. The light flux reflected off the second reflection surface 36 and passing through the second transmissive surface 37 exits out of the optical element 33 in the first direction Z1 toward the upper side Y1 and reaches the screen S.

In the projection system 3E, the enlargement-side image formation plane and the enlargement-side image formation plane intersect each other, as shown in FIG. 28. That is, the reduction-side image formation plane, where the liquid crystal panels 18 form the projection images, extends along the plane YZ. The lengthwise direction of the liquid crystal panels 18, that is, the width direction W1 of the projection images extends in the axis-Y direction. The widthwise direction of the liquid crystal panels 18, that is, the height direction H1 of the projection images extends in the axis-Z direction. The screen S, on which the final image is formed, extends along the plane XY. The lengthwise direction of the screen S, that is, the width direction W2 of the final image extends in the axis-X direction. The widthwise direction of the screen S, that is, the height direction H2 of the final image extends in the axis-Y direction.

Lens Data

Data on the lenses of the projection system 3E are listed below.

| Surface number | Name | r | d | nd | vd | Mode | Y |
|---|---|---|---|---|---|---|---|
| Object plane | 18 | 0 | 8.5 | | | Refraction | |
| 1 | 19 | 0 | 35.95 | 1.51633 | 64.14 | Refraction | 12.573 |
| 2 | | 0 | 5 | | | Refraction | 14.999 |
| 3 | L01 | 29.33178 | 10.078656 | 1.442044 | 86.63 | Refraction | 16 |
| 4 | | −46.7571 | 0.1 | | | Refraction | 15.852 |

-continued

| Surface number | Name | r | d | nd | vd | Mode | Y |
|---|---|---|---|---|---|---|---|
| 5 | L02 | 148.79233 | 7.071831 | 1.772054 | 47.71 | Refraction | 14.902 |
| 6 | L03 | −26.54503 | 6.108227 | 2.0196 | 20.783 | Refraction | 14.521 |
| 7 | | −95.30317 | 0.1 | | | Refraction | 13.827 |
| 8 | L04 | 57.12601 | 5.870101 | 1.494958 | 52.92 | Refraction | 12.989 |
| 9 | L05 | −24.31043 | 1 | 2.0508 | 26.942 | Refraction | 12.77 |
| 10 | | −887.31514 | 0.2 | | | Refraction | 12.691 |
| 11 | L06 | 37.22942 | 2.436591 | 1.986125 | 16.48 | Refraction | 12.565 |
| 12 | | 155.01669 | 2.483493 | | | Refraction | 12.414 |
| 13 | L07 | −45.82387 | 8.6095 | 1.526239 | 38.78 | Refraction | 12.314 |
| 14 | | −32.53128 | 9.5 | | | Refraction | 11.559 |
| Aperture plane | | 0 | 0.1 | | | Refraction | 7.5 |
| 16 | L08 | −323.72495 | 2 | 2.0508 | 26.942 | Refraction | 7.5 |
| 17 | | 42.89214 | 1.15812 | | | Refraction | 7.578 |
| 18 | L09 | 1757.31503 | 4.943349 | 1.840029 | 18.61 | Refraction | 7.709 |
| 19 | L10 | −12.35292 | 2 | 2.0508 | 26.942 | Refraction | 7.982 |
| 20 | | −48.32828 | 10.476179 | | | Refraction | 8.812 |
| 21 | 51 | 0 | −18 | | | Reflection | 21.055 |
| 22 | Li1 | −45.45967 | −15 | 1.686174 | 23.14 | Refraction | 19 |
| 23 | L12 | 29.191 | −12.671948 | 1.990031 | 16.9 | Refraction | 19.076 |
| 24 | | 3485.13836 | −4.481986 | | | Refraction | 21.906 |
| *25 | L13 | −105.64407 | −6 | 1.531131 | 55.75 | Refraction | 22.487 |
| *26 | | 519.77235 | −24.526951 | | | Refraction | 23.721 |
| *27 | L14 | 78.70625 | −6 | 1.531131 | 55.75 | Refraction | 27.151 |
| *28 | | −66.20602 | −2.620232 | | | Refraction | 30.053 |
| *29 | 34 | −57.65154 | −47 | 1.509398 | 56.47 | Refraction | 30.974 |
| 30 | 35 | 0 | 18 | 1.509398 | 56.47 | Reflection | 41.343 |
| *31 | 36 | −17.73917 | −40 | 1.509398 | 56.47 | Reflection | 20.636 |
| *32 | 37 | 60 | −286 | | | Refraction | 37.407 |
| Image plane | S | 0 | 0 | | | Refraction | 1897.748 |
| *25 | L13 | −105.64407 | −6 | 1.531131 | 55.75 | Refraction | 22.487 |
| *26 | | 519.77235 | −24.526951 | | | Refraction | 23.721 |
| *27 | L14 | 78.70625 | −6 | 1.531131 | 55.75 | Refraction | 27.151 |
| *28 | | −66.20602 | −2.620232 | | | Refraction | 30.053 |
| *29 | 34 | −57.65154 | −47 | 1.509398 | 56.47 | Refraction | 30.974 |
| 30 | 35 | 0 | 18 | 1.509398 | 56.47 | Reflection | 41.343 |
| *31 | 36 | −17.73917 | −40 | 1.509398 | 56.47 | Reflection | 20.636 |
| *32 | | 60 | −286 | | | Refraction | 37.407 |
| Image plane | S | 0 | 0 | | | Refraction | 1897.748 |

The surface having the surface number of 21 is the reflection surface of the deflector 50. The decenter and bend factor β of the surface having the surface number of 21 is 45. The decenter and bend factor α of the surface having the surface number of 30, that is, the first reflection surface 35 is 45. The aspheric coefficients of each of the aspheric surfaces are the same as those in Example 1. That is, the aspheric coefficients of the surfaces having the surface numbers of 25 to 29, 31, and 32 are equal to those of the surfaces having the surface numbers of 24 to 28, 30, and 31 in Example 1.

The second length R2, which is the overall length of the second section 52, is shorter than the first length R1, which is the overall length of the first section 51, as indicated by the lens data. The first length R1 and the second length R2 are equal to those in Example 3.

Effects and Advantages

The projection system 3E according to the present example can provide the same effects and advantages as those provided by the projection system 3C according to Example 3.

In the present example, the deflector 50, which deflects the first optical axis N1 of the first optical system 31, which extends in the axis-X direction, toward the upper side Y1 is disposed. The first optical system 31 thus includes the second section 52, which extends in the axis-Y direction, and the first section 51, which extends in the axis-X direction. Therefore, the size of the projection system 3E according to the present example increases in the axis-X direction but can be reduced in the axis-Y direction as compared with the projection system 3A according to Example 1.

In the present example, the reduction-side image formation plane, where the liquid crystal panels 18 form the projection images, extends along the plane YZ. The lengthwise direction of the liquid crystal panels 18, that is, the width direction W1 of the projection images extends in the axis-Y direction. The widthwise direction of the liquid crystal panels 18, that is, the height direction H1 of the projection images extends in the axis-Z direction. The image formation section 2 of the projector 1 is configured to extend in the lengthwise direction of the liquid crystal panels 18 in some cases. In such a case, the footprint of the image formation section 2 can be reduced in the present example when the projector 1 is viewed from the upper side Y1.

Figure 29:
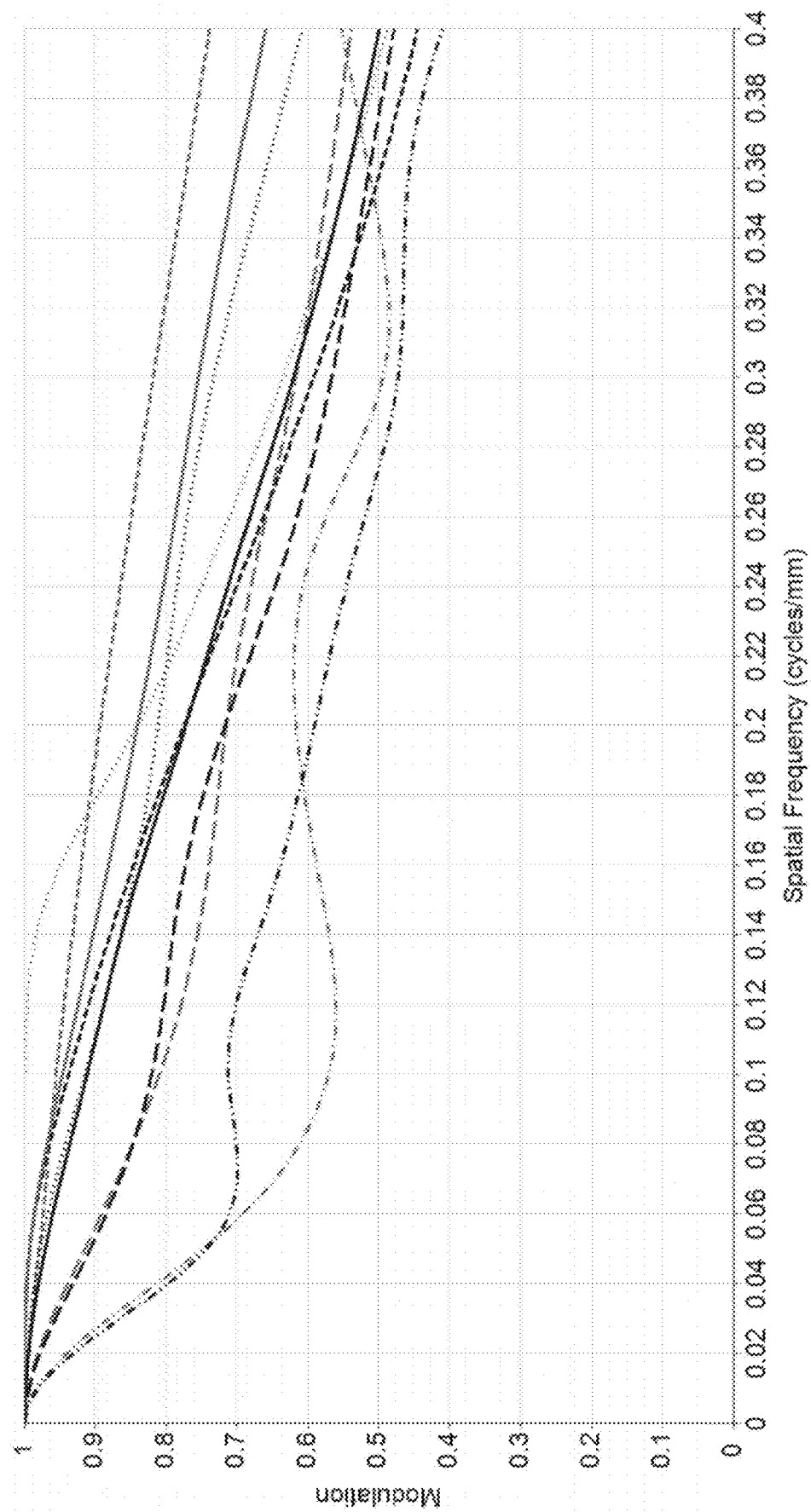
FIG. 29 shows the enlargement-side MTF of the projection system according to Example 5.
Figure 30:
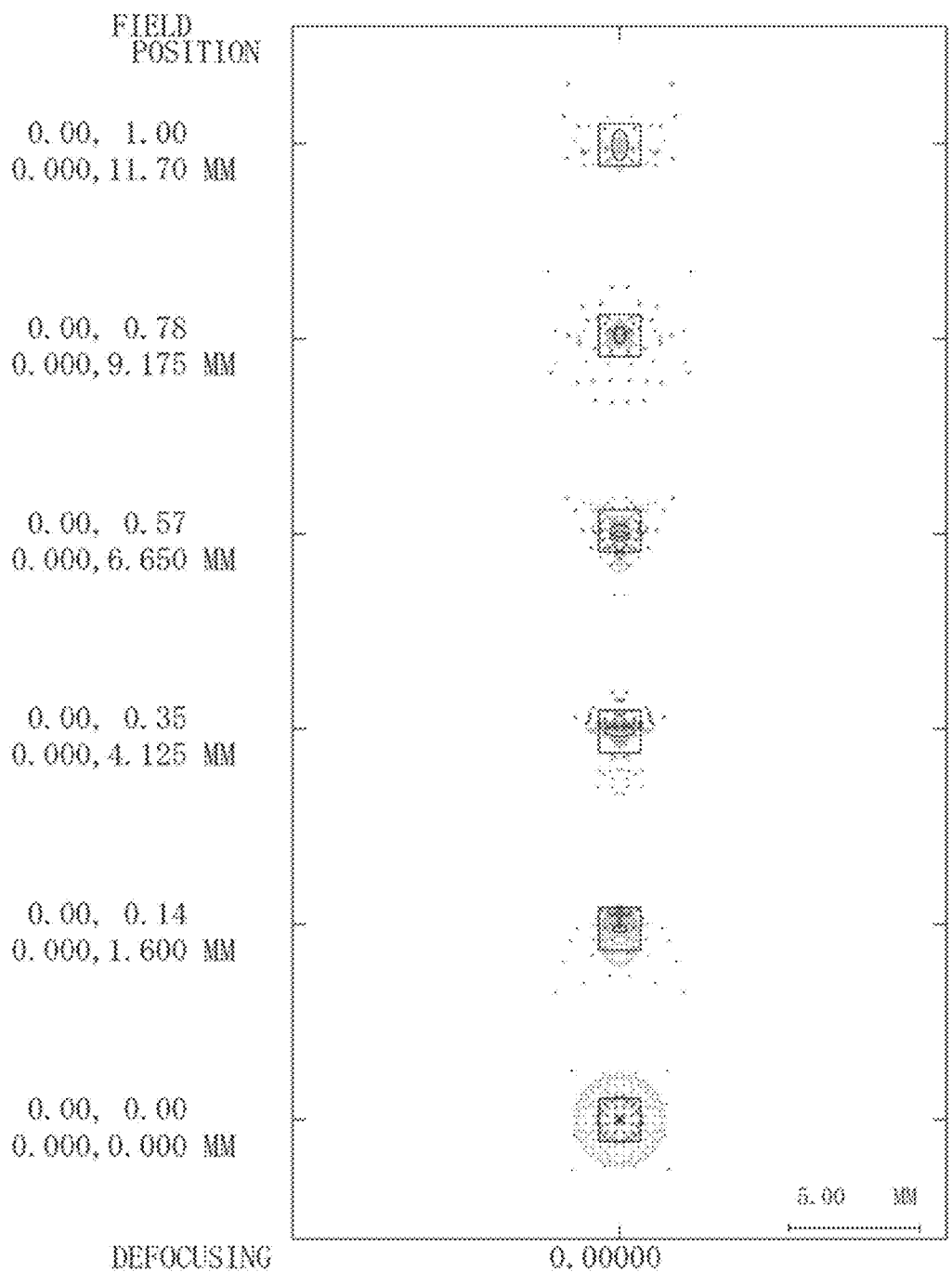
FIG. 30 is a spot diagram of a light spot produced by the projection system according to Example 5.

FIG. 29 shows the enlargement-side MTF of the projection system 3E. FIG. 30 is a spot diagram showing how well the light is collected on an image height position basis. The projection system 3E provides high resolution, as shown in FIGS. 29 and 30.

Example 6

Figure 31:
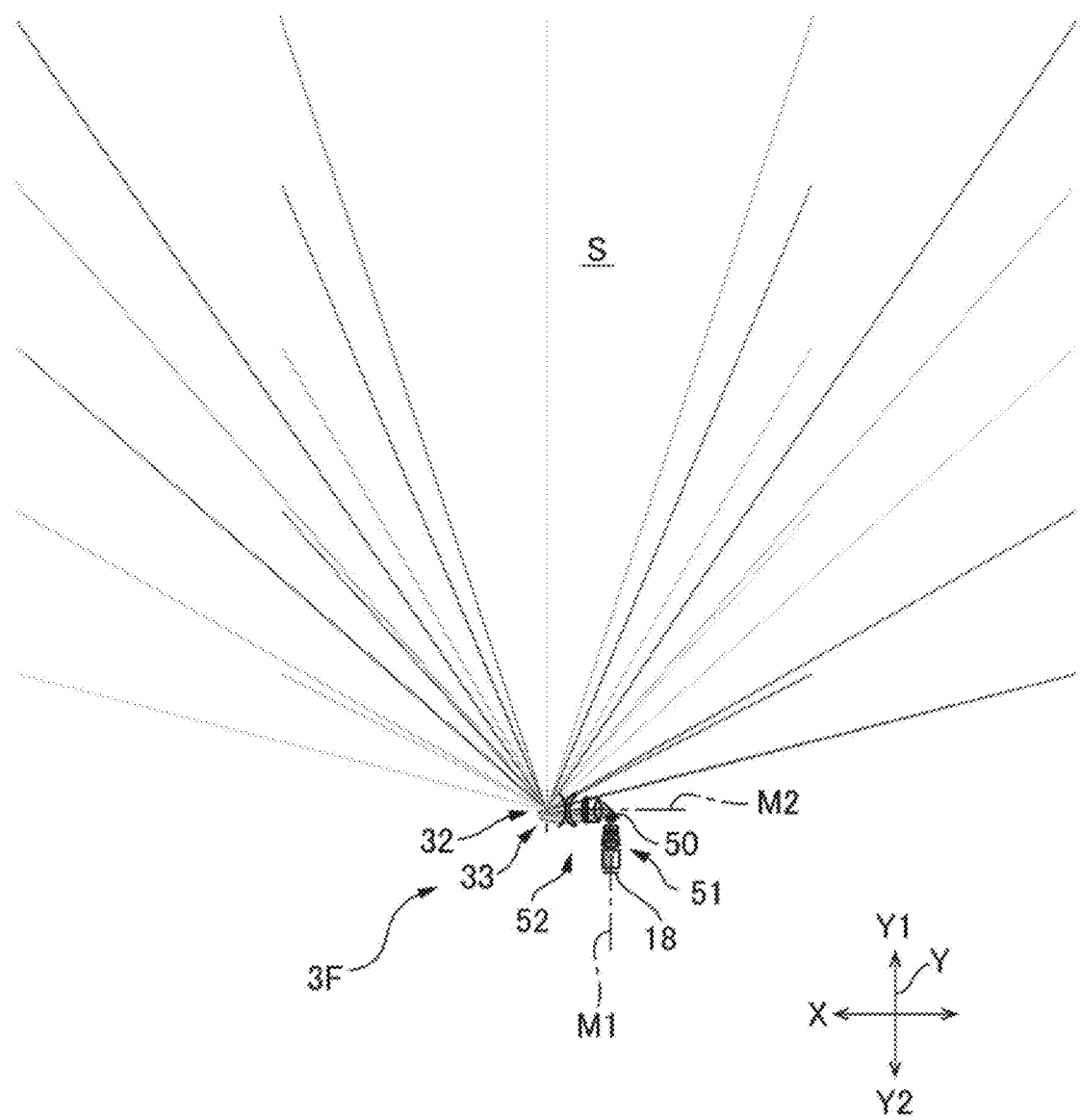
FIG. 31 is a light ray diagram diagrammatically showing the entire projection system according to Example 6.
Figure 32:
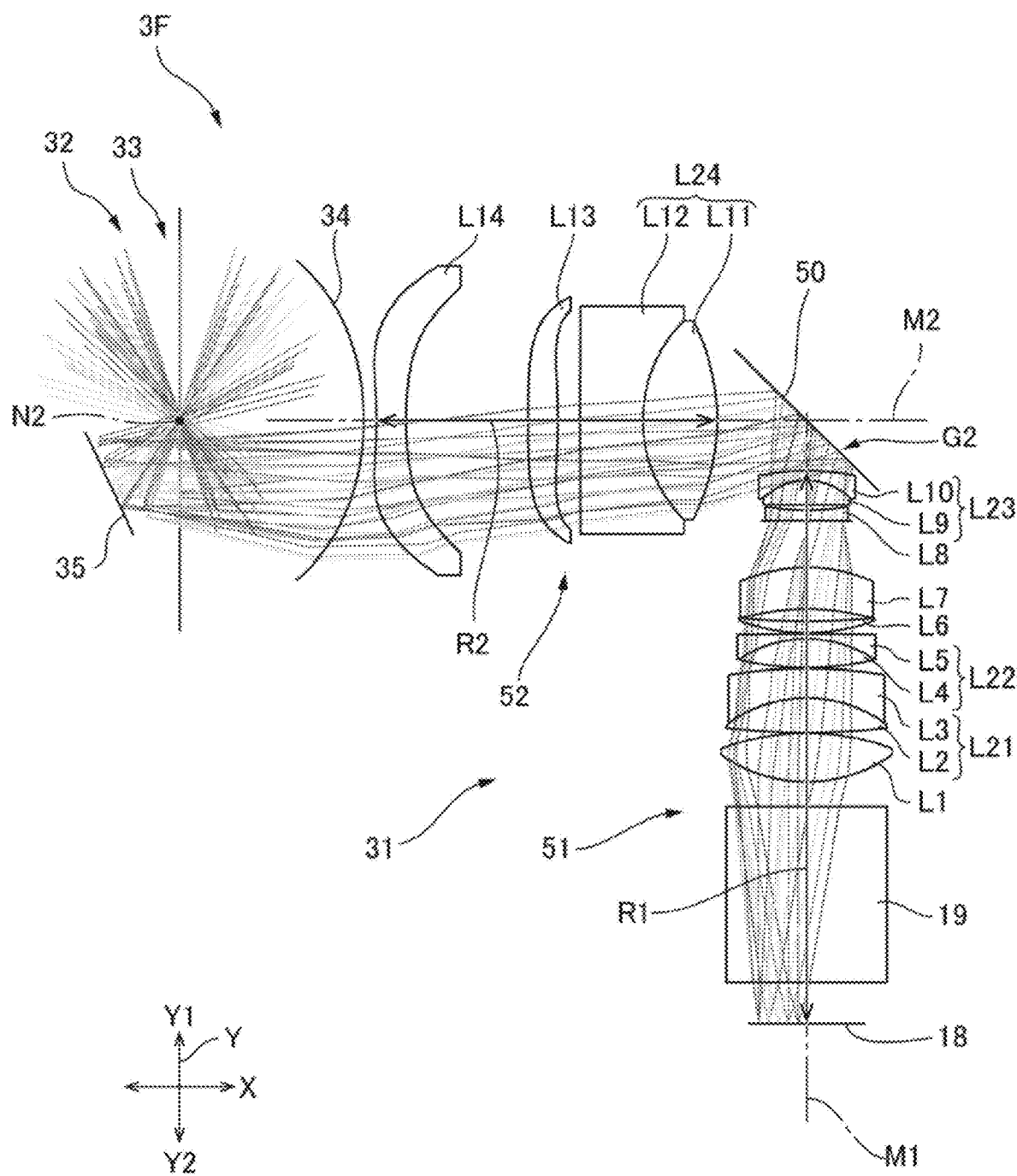
FIG. 32 is a light ray diagram of the projection system according to Example 6.
Figure 33:
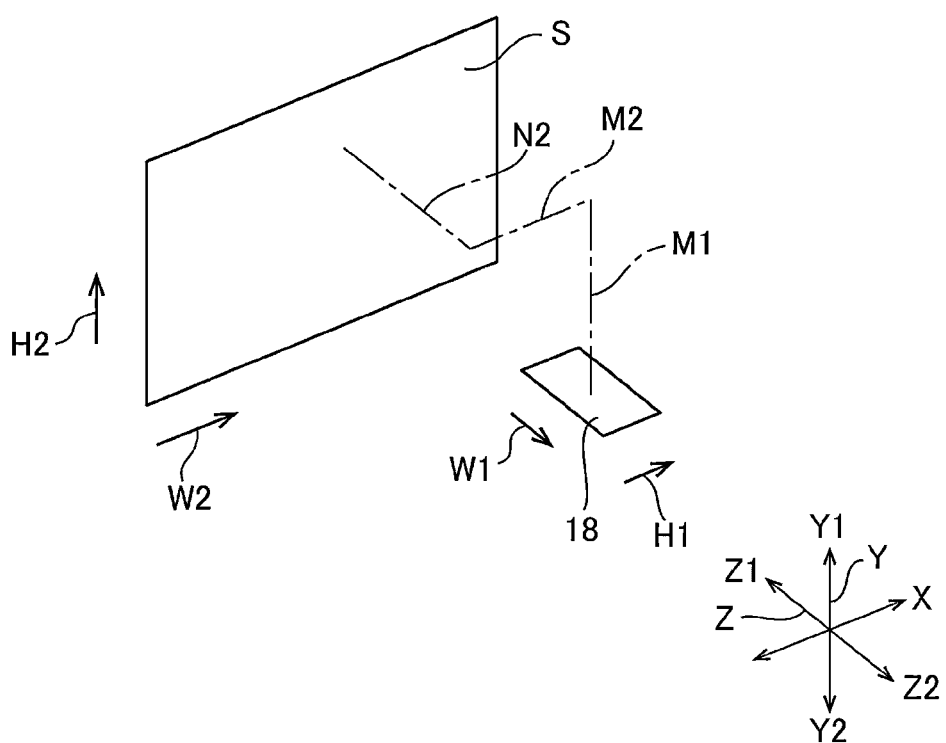
FIG. 33 is a descriptive diagram diagrammatically showing the optical axis of the projection system according to Example 6.

FIG. 31 is a light ray diagram diagrammatically showing the entirety of a projection system 3F according to Example 6. FIG. 32 is a light ray diagram of the projection system 3F according to Example 6. The projection system 3F is viewed in the axis-Z direction, which is perpendicular to the screen S, in FIGS. 31 and 32. In FIGS. 31 and 32, the contour of the optical element 33, which forms the second optical system 32, is omitted. FIG. 33 is a descriptive diagram diagrammatically showing the optical axis of the projection system 3F from the reduction-side image formation plane to the enlargement-side image formation plane.

The projection system 3F according to the present example is so configured based on the projection system 3B according to Example 2 that the deflector 50, which deflects the first optical axis N1, is disposed in the middle of the first optical system 31. The projection system 3E according to the present example is further so configured that the deflector 50 deflects the first optical axis N1 in a direction different from the direction in the projection system 3D according to Example 4. The lenses L1 to L14 and the optical element 33 of the second optical system 32 are the same as those in the projection system 3B.

The projection system 3F according to the present example includes the first optical system 31 and the second optical system 32 sequentially arranged from the reduction side toward the enlargement side, as shown in FIG. 31. The first optical system 31 is a refractive optical system including the plurality of lenses L1 to L14 and the deflector 50. The first optical system 31 includes the cross dichroic prism 19 and the 14 lenses L1 to L14, as shown in FIG. 32. The lenses L2 and L3 are bonded to each other into the first doublet L21. The lenses L4 and L5 are bonded to each other into the second doublet L22. The lenses L9 and L10 are bonded to each other into the third doublet L23. The lenses L11 and L12 are bonded to each other into the fourth doublet L24.

The deflector 50 is a flat mirror. The deflector 50 is disposed in the first air gap G2 having the largest axial inter-surface distance out of a plurality of air gaps provided between the lenses adjacent to each other in the first optical system 31, as shown in FIGS. 11, 12, and 32. The first air gap G2 is the gap between the lens L10 and the lens L11, that is, between the third double L23 and the fourth doublet L24. The deflector 50 is disposed in the first air gap G2 and deflects the first optical axis N1 of the first optical system 31. In the first optical system 31, the first section 51 located on the reduction side of the deflector 50 includes the lenses L1 to L10. In the first optical system 31, the second section 52 located on the enlargement side of the deflector 50 includes the lenses L11 to L14.

The thus disposed deflector 50 causes the first optical axis section M1, which is the optical axis of the first section 51, and the second optical axis section M2, which is the optical axis of the second section 52, to intersect each other. In the present example, the angle between the first optical axis section M1 and the second optical axis section M2 is 90°.

The first optical axis section M1 extends in the axis-Y direction, and the second optical axis section M2 extends in the axis-X direction. The deflector 50 deflects the light flux that exits out of the first section 51 toward the upper side Y1 by 90° in the axis-X direction, which extends along the screen S.

The first section 51 has positive power. The second section 52 has negative power. The first optical system 31 as a whole has positive power. Therefore, between the first optical system 31 and the second optical system 32, the distance between the chief rays therein decreases as they approach the second optical system 32.

The optical element 33 has the first transmissive surface 34, the first reflection surface 35, the second reflection surface 36, and the second transmissive surface 37 sequentially arranged from the reduction side toward the enlargement side. The first transmissive surface 34 has a convex shape protruding toward the reduction side. The first reflection surface 35 is a flat surface. The second reflection surface 36 has a concave shape. The second transmissive surface 37 has a convex shape protruding toward the enlargement side.

The light flux having exited out of the first optical system 31 in the axis-X direction is incident on the first transmissive surface 34. The first reflection surface 35 deflects the light flux having passed through the first transmissive surface 34 by 90° in the second direction Z2, which is the direction away from the screen S. The light flux reflected off the first reflection surface 35 is reflected off the second reflection surface 36 in the first direction Z1 toward the upper side Y1. The light flux reflected off the second reflection surface 36 and passing through the second transmissive surface 37 exits out of the optical element 33 in the first direction Z1 toward the upper side Y1 and reaches the screen S.

In the projection system 3F, the enlargement-side image formation plane and the enlargement-side image formation plane intersect each other, as shown in FIG. 33. That is, the reduction-side image formation plane, where the liquid crystal panels 18 form the projection images, extends along the plane XZ. The lengthwise direction of the liquid crystal panels 18, that is, the width direction W1 of the projection images extends in the axis-Z direction. The widthwise direction of the liquid crystal panels 18, that is, the height direction H1 of the projection images extends in the axis-X direction. The screen S, on which the final image is formed, extends along the plane XY. The lengthwise direction of the screen S, that is, the width direction W2 of the final image extends in the axis-X direction. The widthwise direction of the screen S, that is, the height direction H2 of the final image extends in the axis-Y direction.

Lens Data

Data on the lenses of the projection system 3F are listed below.

| Surface number | Name | r | d | nd | vd | Mode | Y |
|---|---|---|---|---|---|---|---|
| Object plane | 18 | 0 | 8.5 | | | Refraction | |
| 1 | 19 | 0 | 35.95 | 1.51633 | 64.14 | Refraction | 12.573 |
| 2 | | 0 | 5 | | | Refraction | 14.999 |
| 3 | L01 | 29.33178 | 10.078656 | 1.442044 | 86.63 | Refraction | 16 |
| 4 | | −46.7571 | 0.1 | | | Refraction | 15.852 |
| 5 | L02 | 148.79233 | 7.071831 | 1.772054 | 47.71 | Refraction | 14.902 |
| 6 | L03 | −26.54503 | 6.108227 | 2.0196 | 20.783 | Refraction | 14.521 |
| 7 | | −95.30317 | 0.1 | | | Refraction | 13.827 |
| 8 | L04 | 57.12601 | 5.870101 | 1.494958 | 52.92 | Refraction | 12.989 |

-continued

| Surface number | Name | r | d | nd | vd | Mode | Y |
|---|---|---|---|---|---|---|---|
| 9 | L05 | −24.31043 | 1 | 2.0508 | 26.942 | Refraction | 12.77 |
| 10 | | −887.31514 | 0.2 | | | Refraction | 12.691 |
| 11 | L06 | 37.22942 | 2.436591 | 1.986125 | 16.48 | Refraction | 12.565 |
| 12 | | 155.01669 | 2.483493 | | | Refraction | 12.414 |
| 13 | L07 | −45.82387 | 8.6095 | 1.526239 | 38.78 | Refraction | 12.314 |
| 14 | | −32.53128 | 9.5 | | | Refraction | 11.559 |
| Aperture plane | | 0 | 0.1 | | | Refraction | 7.5 |
| 16 | L08 | −323.72495 | 2 | 2.0508 | 26.942 | Refraction | 7.5 |
| 17 | | 42.89214 | 1.15812 | | | Refraction | 7.578 |
| 18 | L09 | 1757.31503 | 4.943349 | 1.840029 | 18.61 | Refraction | 7.709 |
| 19 | L10 | −12.35292 | 2 | 2.0508 | 26.942 | Refraction | 7.982 |
| 20 | | −48.32828 | 10.476179 | | | Refraction | 8.812 |
| 21 | 51 | 0 | −18 | | | Reflection | 13.186 |
| 22 | L11 | −45.45967 | −15 | 1.686174 | 23.14 | Refraction | 19 |
| 23 | L12 | 29.191 | −12.671948 | 1.990031 | 16.9 | Refraction | 19.076 |
| 24 | | 3485.13836 | −4.481986 | | | Refraction | 21.906 |
| *25 | L13 | −105.64407 | −6 | 1.531131 | 55.75 | Refraction | 22.487 |
| *26 | | 519.77235 | −24.526951 | | | Refraction | 23.721 |
| *27 | L14 | 78.70625 | −6 | 1.531131 | 55.75 | Refraction | 27.151 |
| *28 | | −66.20602 | −2.620232 | | | Refraction | 30.053 |
| *29 | 34 | −57.65154 | −37 | 1.509398 | 56.47 | Refraction | 30.974 |
| 30 | 35 | 0 | 28 | 1.509398 | 56.47 | Reflection | 41.343 |
| *31 | 36 | −17.73917 | −40 | 1.509398 | 56.47 | Reflection | 20.636 |
| *32 | 37 | 60 | −286 | | | Refraction | 37.407 |
| Image plane | S | 0 | 0 | | | Refraction | 1897.748 |

The surface having the surface number of 21 is the reflection surface of the deflector 50. The decenter and bend factor α of the surface having the surface number of 21 is −45. The decenter and bend factor α of the surface having the surface number of 30, that is, the first reflection surface 35 is 45. The aspheric coefficients of each of the aspheric surfaces are the same as those in Example 1. That is, the aspheric coefficients of the surfaces having the surface numbers of 25 to 29, 31, and 32 are equal to those of the surfaces having the surface numbers of 24 to 28, 30, and 31 in Example 1.

The second length R2, which is the overall length of the second section 52, is shorter than the first length R1, which is the overall length of the first section 51, as indicated by the lens data. The first length R1 and the second length R2 are equal to those in Example 3.

Effects and Advantages

The projection system 3F according to the present example can provide the same effects and advantages as those provided by the projection system 3D according to Example 4.

In the present example, the deflector 50, which deflects the first optical axis N1 of the first optical system 31, which extends in the axis-X direction, in the axis-Y direction, is disposed. The first optical system 31 thus includes the second section 52, which extends in the axis-X direction, and the first section 51, which extends in the axis-Y direction. The size of the projection system 3F according to the present example can therefore be reduced in the axis-X direction as compared with the projection system 3B according to Example 2.

Figure 34:
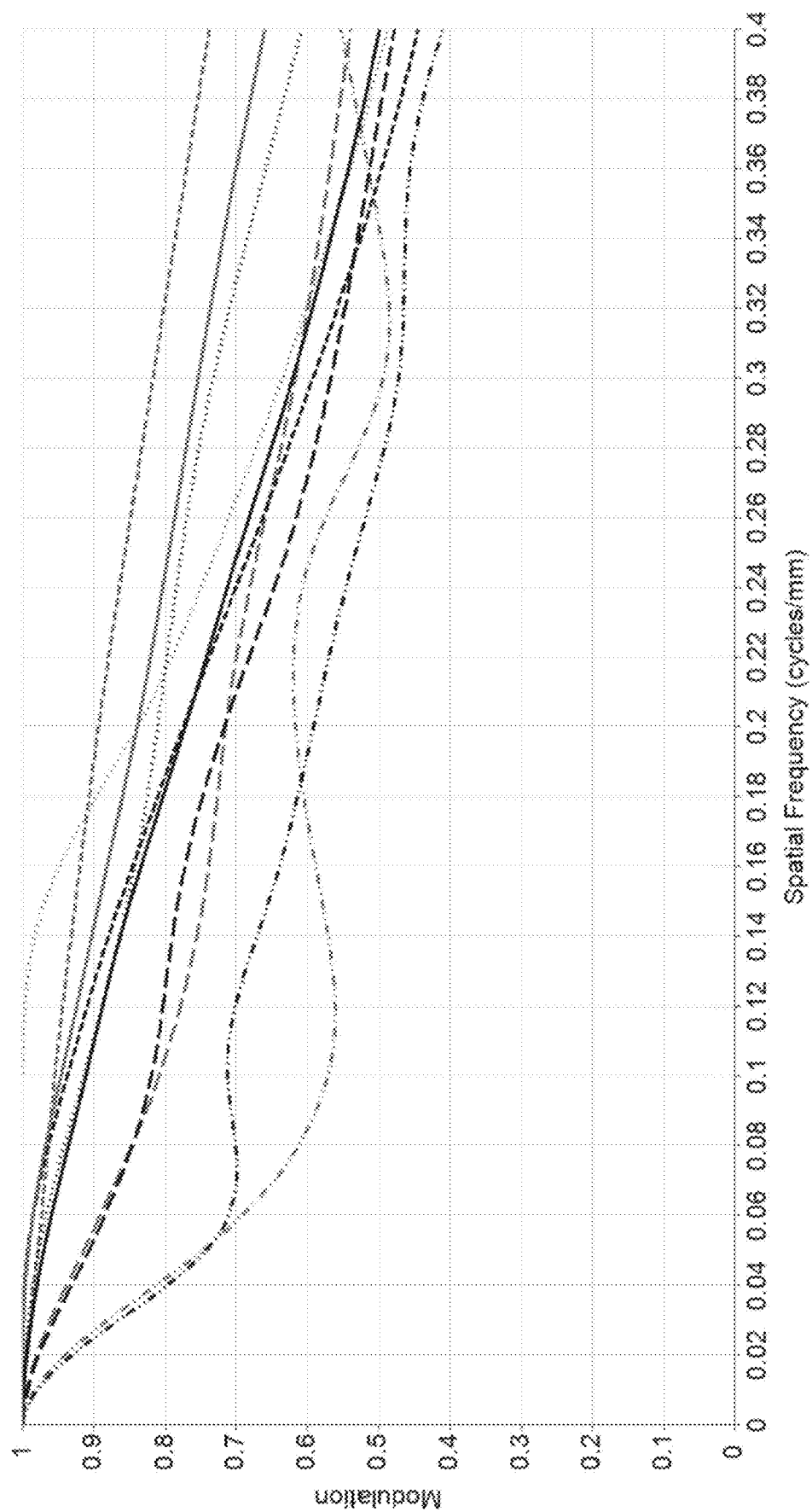
FIG. 34 shows the enlargement-side MTF of the projection system according to Example 6.
Figure 35:
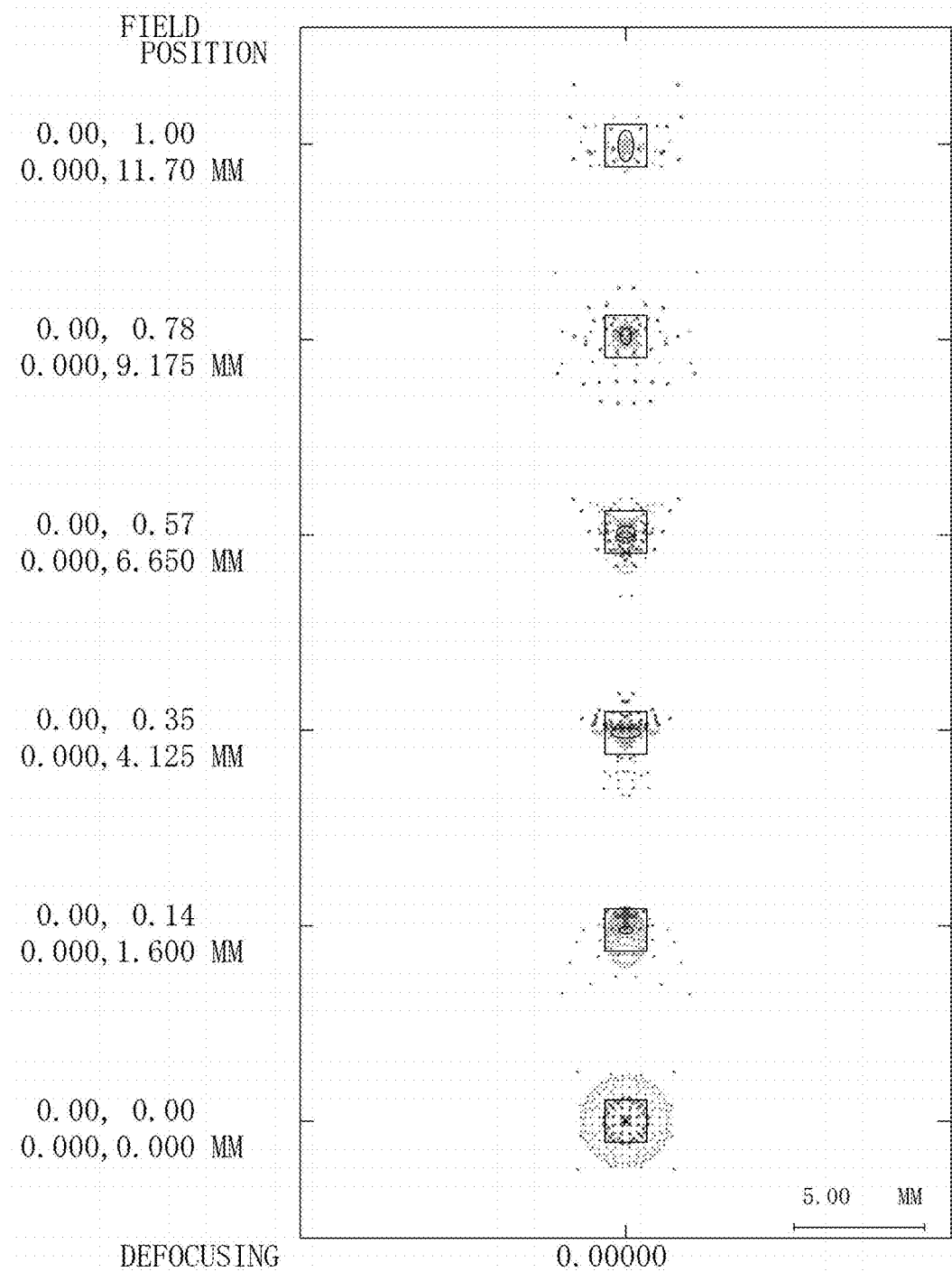
FIG. 35 shows a spot diagram of a light spot produced by the projection system according to Example 6.

FIG. 34 shows the enlargement-side MTF of the projection system 3F. FIG. 35 is a spot diagram showing how well the light is collected on an image height position basis. The projection system 3F provides high resolution, as shown in FIGS. 34 and 35.

What is claimed is:
1. A projection system comprising:
a first optical system; and
a second optical system including an optical element and disposed on an enlargement side of the first optical system, wherein:
the optical element has a first transmissive surface, a first reflection surface disposed on the enlargement side of the first transmissive surface, a second reflection surface disposed on the enlargement side of the first reflection surface, and a second transmissive surface disposed on the enlargement side of the second reflection surface,
the second reflection surface has a concave shape,
a first optical axis of the first optical system and a second optical axis of the second reflection surface intersect each other,
the first transmissive surface and the first reflection surface are located on one side of the first optical axis,
the second reflection surface is located on other side of the first optical axis,
the optical element includes only two reflection surfaces and only two transmissive surfaces, which are the first transmissive surface, the first reflection surface, the second reflection surface and the second transmissive surface with the first reflection surface and the second reflection surface being the only reflection surfaces along an optical path between the first transmissive surface and the second transmissive surface,
the first reflection surface reflects a light flux passing through the first transmissive surface in a direction that intersects the first optical axis,
the first reflection surface reflects by 90° the light flux passing through the first transmissive surface, and
the first reflection surface is a flat mirror.

2. The projection system according to claim 1,
wherein the first transmissive surface, the first reflection surface, and the second reflection surface are located on one side of the second optical axis, and
the second transmissive surface is located on other side of the second optical axis.

3. The projection system according to claim 1,
wherein the first optical system includes a plurality of lenses and a deflector.

4. The projection system according to claim 3,
wherein the deflector is disposed in an air gap having a largest axial inter-surface distance along the first optical axis out of a plurality of air gaps provided between the lenses adjacent to each other in the first optical system, and
the first optical system includes a first section disposed on a reduction side of the deflector and a second section disposed on the enlargement side of the deflector.

5. The projection system according to claim 3,
wherein the deflector is a flat mirror.

6. The projection system according to claim 4,
wherein the first section has positive power, and
the second section has negative power.

7. The projection system according to claim 4,
wherein a second length that is an overall length of the second section is shorter than a first length that is an overall length of the first section.

8. The projection system according to claim 4,
wherein a reduction-side image formation plane of the projection system is parallel to an enlargement-side image formation plane of the projection system.

9. The projection system according to claim 1,
wherein a reduction-side image formation plane of the projection system intersects an enlargement-side image formation plane of the projection system.

10. The projection system according to claim 1,
wherein the second transmissive surface has a convex shape protruding toward the enlargement side.

11. The projection system according to claim 1,
wherein the first light transmissive surface has a convex shape protruding toward a reduction side.

12. The projection system according to claim 1,
wherein at least one of the first transmissive surface, the second reflection surface, and the second transmissive surface is an aspheric surface.

13. The projection system according to claim 1,
wherein between the first optical system and the second optical system, a gap between chief rays therein decreases as the chief rays approach the second optical system.

14. The projection system according to claim 1,
wherein an intermediate image is formed on a reduction side of the second reflection surface.

15. A projector comprising:
the projection system according to claim 1; and
an image formation section that forms a projection image in a reduction-side image formation plane of the projection system.

16. The projection system according to claim 1,
wherein the first optical axis and the second optical axis are perpendicular to each other.

17. The projection system according to claim 1, wherein:
the first transmissive surface is located on both sides of the first optical axis and on only one side of the second optical axis,
the first reflection surface is located on only one side of the first optical axis and on only one side of the second optical axis,
the second reflection surface is located on only one side of the first optical axis and on both sides of the second optical axis, and
the first optical axis and the second optical axis are perpendicular to each other.

* * * * *